(12) United States Patent
Bogar

(10) Patent No.: US 8,567,280 B2
(45) Date of Patent: Oct. 29, 2013

(54) ROLLER TRANSMISSION AND GEARING MECHANISM

(75) Inventor: Istvan Bogar, Pomaz (HU)

(73) Assignee: Pal Bogar, Budapest (HU)

( * ) Notice: Subject to any disclaimer, the term of this patent is extended or adjusted under 35 U.S.C. 154(b) by 1033 days.

(21) Appl. No.: 12/087,271

(22) PCT Filed: Dec. 29, 2006

(86) PCT No.: PCT/HU2006/000131
§ 371 (c)(1),
(2), (4) Date: Jun. 30, 2008

(87) PCT Pub. No.: WO2007/077470
PCT Pub. Date: Jul. 12, 2007

(65) Prior Publication Data
US 2008/0314179 A1    Dec. 25, 2008

(30) Foreign Application Priority Data
Dec. 30, 2005    (HU) ...................................... 0501213

(51) Int. Cl.
*F16H 25/06*    (2006.01)
(52) U.S. Cl.
USPC .......................................... 74/458; 74/424.5
(58) Field of Classification Search
USPC ......... 74/465, 416, 464, 457, 458, 424.5, 425
See application file for complete search history.

(56) References Cited

U.S. PATENT DOCUMENTS

| | | | | |
|---|---|---|---|---|
| 2,973,660 | A | * | 3/1961 | Popper .......................... 74/424.5 |
| 4,656,884 | A | * | 4/1987 | Nemoto ........................ 74/424.5 |
| 6,092,434 | A | | 7/2000 | Matsumoto et al. |
| 6,095,009 | A | | 8/2000 | Takagi |
| 2002/0170374 | A1 | * | 11/2002 | Stewart ........................... 74/465 |

FOREIGN PATENT DOCUMENTS

| | | |
|---|---|---|
| EP | 0 349 209 | 1/1990 |
| GB | 209 737 | 5/1924 |
| JP | 07 310802 | 11/1995 |
| WO | 02/103220 | 12/2002 |

\* cited by examiner

*Primary Examiner* — David M Fenstermacher
*Assistant Examiner* — Terence Boes

(57) ABSTRACT

A roller transmission and gearing mechanism with a driving body, one or more rollers, and a driven body coupled to the driven body via the rollers. The bodies define at least one pair of respective roller guide tracks thereon. The guide tracks start and terminate at respective pairs of limit surfaces. The rollers contact the guide tracks along rolling curves, and distances between points of the rolling curve on the driving body and the respective rolling curve on the driven body are different such that: for all contacting point-pairs on the rolling curves, the respective tangential planes are parallel to each other; the velocities of the contacting pairs of points are identical but have opposite signs; in the contacting points, the action lines of forces intersect the central axes of the rollers; and the lengths of the rolling curves of the driving and driven bodies are equal.

14 Claims, 18 Drawing Sheets

Figure 2
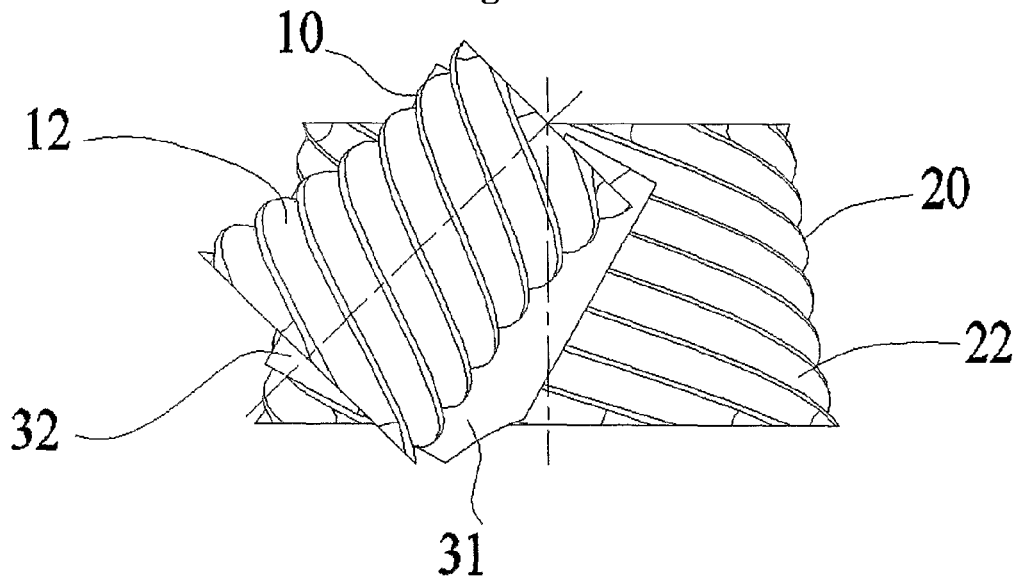
Figure 3
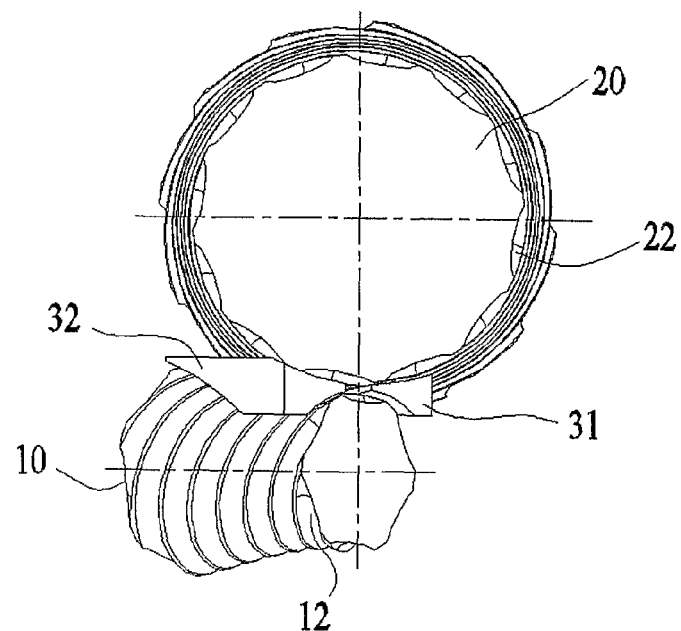
Figure 4

ROLLER TRANSMISSION AND GEARING MECHANISM

BACKGROUND OF THE INVENTION

1. Field of the Invention

The invention relates to a roller transmission and gearing mechanism that comprises a driving body, roller means having respective centres or central axes, and a driven body, wherein the driving body is coupled to the driven body by means of the roller means, the driving and driven body are guided for movement having a single degree of freedom, the driving and driven bodies both define respective roller guide tracks thereon, the tracks contact the roller means and determine the relative movement of the roller means with respect to the associated body, the roller means contact the roller guide tracks along respective rolling curves, the roller guide tracks start and terminate on the driving and driven bodies at respective pairs of limit surfaces, the roller means move along their associated roller guide tracks, wherein the roles of the driving and driven bodies can be interchanged.

2. Description of Related Art

Power transmission and gearing systems are fundamental to the mechanical engineering industry and there are a large variety of them available. Most of them can be characterised by among other things their gearing ratio, the maximum transmissible power, their structural design and dimensions, in particular, the relative position and size of the driving and driven bodies, the changeability of the direction of rotation of the driven body relative to the driving body, and last but not least their power transmission efficiency.

Worm gears for example are notorious for their particularly low power transmission efficiency. They dissipate significant amounts of energy due to large frictional energy losses as a result of extensive sliding between their contact surfaces. There have been various propositions made in the past to reduce the extent of sliding via the introduction of rolling balls between the contact surfaces of the grooves of the worm and the teeth of the worm wheel. Thus the worm and the worm wheel were not in direct contact any more but the coupling between them was established via a set of rolling balls. The balls while in coupling position moved along a path between the worm and the worm wheel. When they reached the end of the path they exited the path and disengaged from coupling. Then they were led back through an external device to the beginning of the path where they re-established coupling again.

Such propositions can be found e.g. in U.S. Pat. Nos. 3,365,974, 2,664,760, 4,656,884 and 4,283,329. These designs, however, have not managed to bring on all the benefits that could have been expected from the application of rolling balls because the conditions for pure rolling motion for the balls were not met. In the absence of these conditions the balls were forced to slide extensively along their tracks resulting in sub-optimal transmission efficiency due to significant frictional energy losses.

In the case of classical ball screws that are used for linear movements, for example those used for table movements in machine tools, the conditions for pure rolling motion for the rollers are automatically satisfied. Such a design is shown e.g. in FIG. 3 of U.S. Pat. No. 6,092,434. This is because the driving and driven bodies have collinear or common rotational axes and the roller guide tracks are concentric. In terms of pure rolling motion for the rollers this is the only known example for a roller transmission and gearing system that is used widely for its small frictional energy losses and other advantages of pure rolling motion. In such a motion both the driving and driven bodies are provided by respective roller guide tracks and the balls roll along these guide track and contact the tracks along respective rolling curves. In every moment each ball contacts one contact point of the rolling curve of the driving body and one point of the driven body. As the rolling curves are co-axial helical lines (spirals), the distance between them is constant. The distance between any point of the rolling curve on the driving body with the rolling curve on the driven body can be determined as it is known from the rules of geometry, i.e. if we connect said point with different points of the rolling curve on the driven body, and by definition the shortest one of these connecting lines will be the distance. For coaxial rolling curves this distance will be the same for all points of both rolling curves. These conditions are not fulfilled in case the rolling curves are not coaxial and have forms different from the regular helical lines.

The fact, however, that ball-screws of the mentioned coaxial type can only be applied for transforming rotational movement to a linear displacement along a path parallel to the axis of rotation, makes them inapplicable in providing movements of higher degrees of freedom such as those along two- or three-dimensional paths; and due to such limitations this particular gearing system has not become more generally applicable and widespread.

The most widespread gearing mechanism is trivially the one using toothed wheels. It has numerous advantages and also quite a few disadvantages. One of the disadvantages is that the engagement factor i.e. the number of teeth in simultaneous contact at any given time is relatively small and cannot be increased significantly. This means that the mechanical load is concentrated on a small number of engaging teeth and therefore the maximum transmissible power is relatively low compared to the size and space used, and difficult to increase significantly. Besides the limitations for the maximum transmissible power, there is not much room for manoeuvring to vary the distance and the angle between the driving and driven shafts either. Another constraint for the design is that for a given structural configuration of connecting wheels the relative direction of rotation for the wheels is predetermined. In order to change the relative direction of rotation an extra wheel must be inserted among the wheels. This, on one hand, increases the size of the set-up and, on the other hand, introduces extra frictional energy losses. One of the most important disadvantages of the toothed wheels is frictional energy losses arising from the fact that the connecting teeth of the wheels slide on each other most of the time of their engagement. This causes a significant reduction in the power transmission efficiency even if proper lubrication is applied.

SUMMARY OF THE INVENTION

It is a primary objective of the present invention to provide a novel transmission and gearing mechanism, that is free of most of the aforementioned drawbacks and limitations of the existing transmission and gearing systems, has a higher power-transmission efficiency, requires smaller space and can transmit higher torques.

For solving this object according to the invention it has been recognized that a novel rolling transmission and gearing mechanism should be provided, wherein a pure rolling motion is realized between the driving, rolling and driven bodies.

Accordingly a roller transmission and gearing mechanism has been provided that comprises a driving body, roller means having respective centres or central axes, and a driven body, wherein the driving body is coupled to the driven body by means of the roller means, the driving and driven body are guided for movement having a single degree of freedom, the driving and driven bodies both define respective roller guide tracks thereon, the tracks contact the roller means and determine the relative movement of the roller means with respect to the associated body, the roller means contact the roller guide tracks along respective rolling curves, the roller guide tracks start and terminate on the driving and driven bodies at respective pairs of limit surfaces, the roller means move along their associated roller guide tracks, wherein the roles of the driving and driven bodies can be interchanged, wherein according to the invention the distances defined between respective points of the rolling curve on the driving body and the rolling curve on the driven body are different, the roller means are moved along the roller guide tracks following their entries till leaving the tracks substantially with pure rolling motion, and for all point-pairs on the rolling curves when being contacted by the roller means it is true that the respective tangential planes drawn at these pairs of points are substantially parallel to each other, the velocities of the contacting pairs of points when defined in the coordinate system of the roller means are substantially identical but have opposite signs, in the contacting points the respective action lines of forces acting on the roller means pass through or intersect the centres or central axes of the roller means, the lengths of the rolling curves of the driving body are substantially equal to the lengths of the rolling curves of the driven body, and the rolling curves have tangential planes before and after the contact points which are angularly inclined with respect to each other.

In this definition the term "single degree of freedom" is not limited to movements along a straight line, but any spatial movement that takes place along a line in general.

The expression "substantially" used at several places means that the conditions defined need not be satisfied with mathematically perfect accuracy but small deviations around the perfect conditions are permitted as long as the advantages of the design justify such tolerances.

In several preferable embodiments the roller means are spherical rolling balls, or they are rotationally symmetric bodies like cylindrical or barrel-like rollers.

The roller transmission and gearing mechanism may preferably comprise respective roller return paths for guiding the rollers means after leaving the roller guide tracks to return and re-enter at respective entry-openings of the roller guide tracks.

It is preferable when at least one of the driving body and the driven body is rotationally symmetric and have respective axes of rotation.

In the previous case it is more preferred when both of the driving body and the driven body are rotationally symmetric and have respective non-parallel rotational axes.

For several applications it is preferable when at least one of the driving body and the driven body has a rotationally symmetric frontal surface, and the roller guide tracks are defined on the frontal surface, and the limiting surfaces are rings.

At a further preferable embodiment at least one of the driving body and the driven body are gear racks set to move along a given line, and the roller guide tracks are defined on the flat surfaces of the gear racks.

In a further preferable embodiment a plurality of roller guide tracks is defined on at least one of the driving or driven bodies.

In that case it is preferable if the roller guide tracks on the same body are identical in shape and curvature and are angularly displaced with respect to each other by respective angular spacing around the rotational axis of the associated body.

An even angular distribution is obtained if the displacement angle is 360°/n, where n is the number of equally spaced roller guide tracks on the body.

At a further preferable embodiment the roller guide tracks are defined on a planar surface of the associated body and they are identical in shape and curvature and are spaced from each other along a predetermined direction.

In a further preferable embodiment either one of the driving body and the driven body comprises ridges with respective side surfaces, and the other body defines grooves conforming in shape with the ridges, so that respective gaps are provided between each of the side surfaces of the ridges and side surfaces of the grooves, the roller means are arranged in at least one of the gaps, the roller guide tracks are defined on the opposing side surfaces of the ridges and the grooves wherein the roller means are arranged.

In another version of this latter embodiment a plurality of roller guide tracks are defined in the gaps and respective roller means are guided along each of the roller guide tracks.

For bi-directional loads it is preferable if the respective roller means are arranged in both of the gaps.

It is furthermore preferable if a plurality of pairs of conforming ridges and grooves are arranged on each of the bodies.

In a further preferable embodiment the roller means are tiny balls filling substantially the gaps. In a preferred alternative embodiment the tiny balls are suspended in a lubricant fluid.

In certain designs the rollers may go astray in side directions relative to their respective guided paths. This can be prevented if the mechanism comprises bafflers that limit any displacement of the roller means in directions other than the path defined by the roller guide tracks. The bafflers are arranged at respective sides of the tracks.

It is also preferred if the mechanism comprises spacers between adjacent roller means to keep a predetermined distance therebetween.

In order to provide a smooth and noiseless circulation of the roller means the direction of the movement of the roller means when leaving the roller guide tracks and their direction of movement when entering the return path close an angle the cosine of which is equal to the ratio of the velocity of the roller means in the return path to the velocity of the roller means when leaving the roller guide tracks, furthermore the same angle is applied between the direction of the return path at the other end thereof and the direction of the movement of the roller means when entering the roller guide tracks.

An alternative solution for providing a well-functioning return path is when a gradually reduced distance is provided between adjacent roller guide tracks close to the roller guide track terminating limit surfaces, and a gradually increased distance is provided between adjacent roller guide tracks close to the roller guide track starting limit surfaces.

In a further way of providing a smooth transition to and from the return path the roller guide tracks are gradually enlarged at the starting and ending portions of the tracks when approaching the limit surfaces, whereby the forces acting on the roller means are reduced and both the entry and discharge of the roller means are facilitated.

The roller transmission and gearing mechanism according to the present invention attains all objectives set and provides a new solution to transmission and gering tasks, wherein direct transmission can be provided in a small space between any relative locations of the driving and driven bodies, the force and torque that can be transmitted can be increased by increasing the engagement factor between the driving and driven bodies. The elimination of sliding movement reduces frictional energy losses and increases power transmission efficiency. The advantages listed are far from being exhaustive.

BRIEF DESCRIPTION OF THE DRAWINGS

The roller transmission and gearing mechanism according to the present invention will now be described in connection with a number of exemplary embodiments thereof, wherein reference will be made to the accompanying drawings. In the drawings:

FIG. 2 is a schematic drawing of the same design as the one in FIG. 1 but without the first wheel 10 shown. The pair of bafflers on the two sides of the roller coupling channel are fully visible as well as the full cycle of the rollers including those rollers in coupling position inside the roller coupling channel and those the roller recycling channel;

FIG. 3 is a schematic drawing of the same design as the one in FIG. 1 without showing the recycling of the rollers;

FIG. 4 is the top-side view of the design given in FIG. 3;

DETAILED DESCRIPTION OF THE INVENTION

Figure 1:
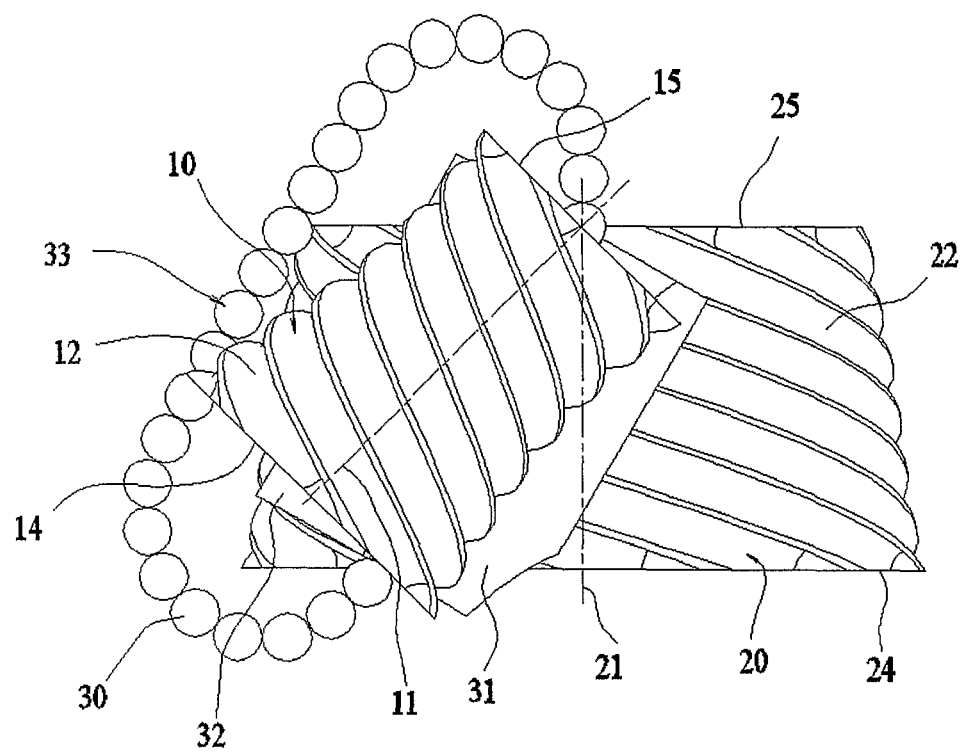
FIG. 1 is a schematic drawing of one of the basic designs for the roller transmission and gearing mechanism according to the present invention.
Figure 1:
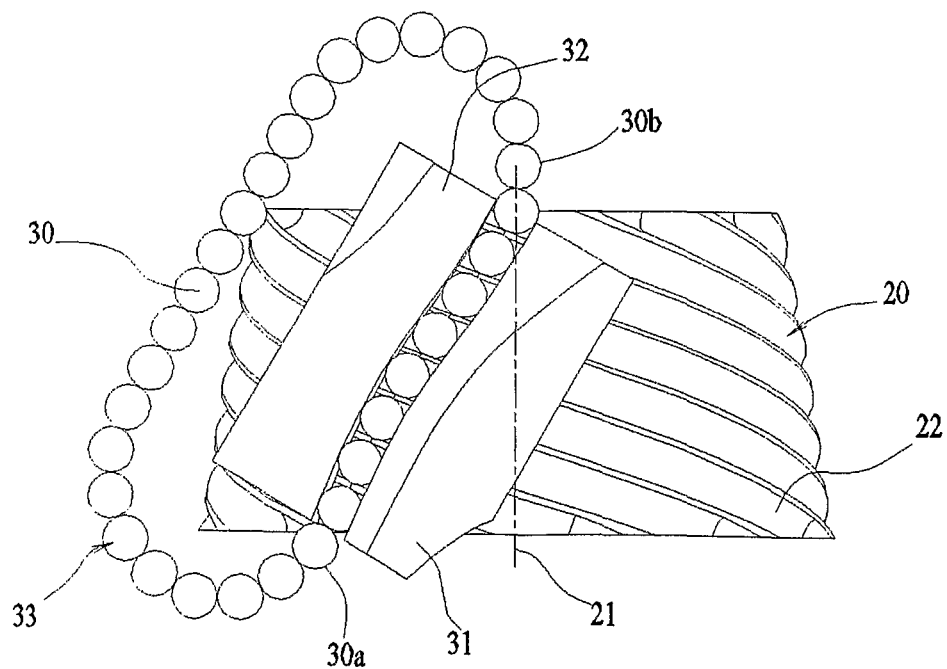

In order to show the main parts and the main features of the roller transmission and gearing mechanism introduced in the present invention first an example for the basic design will be shown where the two bodies are two rotationally symmetric wheels set-up with their rotational axes forming skew lines with respect to each other and including an angle. FIG. 1 shows a schematic drawing of this design including first wheel 10 and second wheel 20 and their respective rotational axes 11 and 21. In the present description, "wheels" mean rotationally symmetric bodies that can rotate around their axes of symmetry but are fixed along their axial directions. Each body has either an inner or an outer rotationally symmetric surface centred at the rotational axis of the body onto which the roller guide tracks are developed. These surfaces will be referred to as track surfaces. The track surfaces are bounded by two separated limit surfaces that are typically but not always planes normal to the axis of rotation. In the example shown in FIG. 1 both wheels 10 and 20 have outer rotationally symmetric track surfaces onto which the roller guide tracks 12 and 22 are developed and all the limit surfaces 14 and 15 for the wheel 10 and 24 and 25 for the wheel 20 are planes normal to the axis of rotation. The rotationally symmetric track surface of the first wheel 10 is considered only between the two limit surfaces 14 and 15. The two limit surfaces 14 and 15 make the two ends i.e. the two frontal surfaces of the first wheel 10. Similarly, the second wheel 20 has limit surfaces 24 and 25.

In the example shown in FIG. 1 the distance between the two rotationally symmetric track surfaces of the first wheel 10 and the second wheel 20 is typically very small yet the two bodies are never in direct contact with each other. Instead, the first wheel 10 and the second wheel 20 are coupled via a number of rollers 30. In the present example, in fact, the rollers are spherical balls. The relative position of the two rotationally symmetric bodies 10 and 20 and also the position of the rollers 30 are best viewed in the schematic drawing in FIG. 5. For both of the two rotationally symmetric bodies there is a line of points on their track surfaces such that the distance between the planes tangential to the track surfaces at these points is equal to the minimum distance between the track surfaces of the two bodies themselves. These two particular tangential planes cut across the rollers 30. Part of the body of each roller 30 is located on the side of the tangential plane of the first wheel 10 that is towards the body of the first wheel 10 and it extends towards and fits into the roller guide track 12 of the first wheel 10. Another part of the body of the same roller 30 is located on the side of the tangential plane of the second wheel 20 that is towards the body of the second wheel 20 and it extends towards and fits into the roller guide track 22 of the second wheel 20. Between the two tangential planes separated by a very small distance as mentioned above the rollers 30 have a very narrow section of their bodies that are outside of both roller guide tracks 12 and 22 of the respective wheels 10 and 20.

It is apparent in FIG. 1, that the roller guide tracks 12 and 22 are developed along a helical line onto the rotationally symmetric track surfaces of the respective wheels 10 and 20. The roller guide tracks 12 and 22 in fact resemble conventional screw threads where the ratio of the number of separate threads on the track surfaces of the first wheel 10 and the second wheel 20 corresponds to the gearing ratio.

As it will be shown in detail below, the number, shape and size of the rollers as well as the number, shape and curvature, and the cross-sectional profile of the roller guide tracks 12 and 22 on the respective wheels 10 and 20 are the results of detailed quantitative design and dimensioning.

The rollers 30 by fitting into the corresponding roller guide tracks on the first wheel 10 and the second wheel 20 establish a rigid coupling between the two wheels. In this way, the rollers do not allow the two wheels to rotate independently of one another.

In the case of the basic design depicted in FIG. 1 the two wheels 10 and 20 are rotationally symmetric bodies where a pair of bafflers 31, 32 is placed in the free space between the track surfaces of the two bodies on the two sides of and directly next to the roller coupling channel. The bafflers 31, 32 are to protect the rollers 30 from going astray in side directions relative to the roller coupling channel. Note, the application of bafflers is not always necessary for all the cases of the various designs of the roller transmission and gearing mechanism according to the present invention because the roller coupling channel in many cases holds the rollers in their channels naturally without the help of external devices. This is the case for example for most of the designs with two parallel rotational axes where the roller guide tracks are developed onto the frontal surfaces as in FIGS. 10-11 and also for most of the designs with grooves and ridges on their track surfaces such as those shown in FIGS. 17-22.

Looking at the example in FIG. 1, when we rotate (drive) for example the first wheel 10 with a certain angular velocity, the rollers 30 will roll along the roller guide tracks 12 and 22 and at the same time transmit torque from the first driving wheel 10 to the second driven wheel 20. The length of the roller guide tracks 12 and 22 is finite- and equal. When the rollers 30 reach the end of the roller guide tracks at the limit surfaces of the wheels, they exit the roller coupling channel and disengage from the coupling between the wheels 10 and 20. In order to keep up a continuous coupling between the wheels 10 and 20 and to make sure that the roller coupling channel is never empty at any point in time, new rollers 30 need to enter the roller guide tracks 12 and 22 at the other limit surfaces of the wheels and roll to the end of the tracks in a new coupling cycle. The new rollers enter the roller guide tracks at the limit surfaces of the wheels when the roller guide tracks on one wheel and the corresponding roller guide tracks on the other wheel together open up an entrance to the roller coupling channel. In order to continuously feed the roller coupling channel with rollers, a closed and continuous loop for the rollers has been set up that recycles the rollers exiting the roller coupling channel back to the beginning of the channel. To emphasise the continuous nature of the recycling of the rollers 30 a continuous line of rollers was shown in FIG. 1. The line of rollers determines roller recycling channel 33. The position of the roller recycling channel 33 should be such as to avoid the wheels 10 and 20. For the roller recycling channel 33 the simplest solution is to use a well-positioned pipe or a basket-like tubular guide inside of which the rollers form a continuous line pushing each other as they move along the recycling path.

In FIG. 2, the first wheel 10 is not present and only the second wheel 20 is shown. On the second wheel 20 the roller guide tracks 22 can be seen that are placed side by side to each other and at an angle relative to the rotational axis of the wheel 21. In the Figure we can see eight rollers 30 sitting one by one in adjacent roller guide tracks 22 with their centres aligned along the roller coupling path. The distance between the adjacent roller guide tracks 22 (and also 12) is apparently larger than the diameter of the rollers. It can also be seen in FIG. 2 that the two bafflers 31 and 32 are placed on the two sides of the roller coupling path to help to keep the rollers on their roller coupling path and on their roller guide tracks 12 and 22. The bafflers 31, 32 are placed directly next to the roller coupling channel and their edges closest to the roller coupling channel are made sharp and follow in shape the line of the roller coupling channel. It can be seen in the Figure that one roller denoted by 30a is just entering the roller coupling channel and the corresponding two roller guide tracks 12 and 22 at the limit surfaces of the two wheels 10 and 20. Another roller denoted by 30b is just disengaging from coupling and exiting the roller coupling channel and the two corresponding roller guide tracks 12 and 22 at the other limit surfaces of the two wheels 10 and 20. After travelling the whole path of the roller recycling channel 33 the roller 30b re-enters the roller coupling channel again at the entry point of the channel where currently the roller 30a can be seen in the Figure and re-establishes coupling between the two wheels 10 and 20.

FIGS. 3 and 4 show the respective front- and top-side views of the same design as the one in FIG. 1. It is apparent in the top-side view in FIG. 4 that in the case of this design there is a multiple of roller guide tracks 12 and 22 developed onto both the first wheel 10 and the second wheel 20, viz. six tracks 12 on the first wheel 10 and twelve tracks 22 on the second wheel 20. The frontal surfaces of both wheels show a multiple of openings for the roller guide tracks evenly distributed along the perimeters making the frontal areas look like polygons. At the openings of the roller guide tracks on the frontal surfaces what we see are the cross-sections of the roller guide tracks' profiles made by the planes of the frontal surfaces of the wheels, and between the openings the cross-sections of the roller guide tracks' walls made also by the same planes. In FIG. 4, we can see both of the bafflers 31 and 32 while in FIG. 3 we can only see the baffler 31 because the first wheel 10 covers the other one 32. The rollers 30 do not exert any significant force or pressure on the bafflers 31 and 32 because the plates are only used to keep the rollers on their roller guide tracks. Since the interaction between the rollers and the bafflers is insignificant, frictional energy losses arising between them will be negligibly small.

Figure 5:
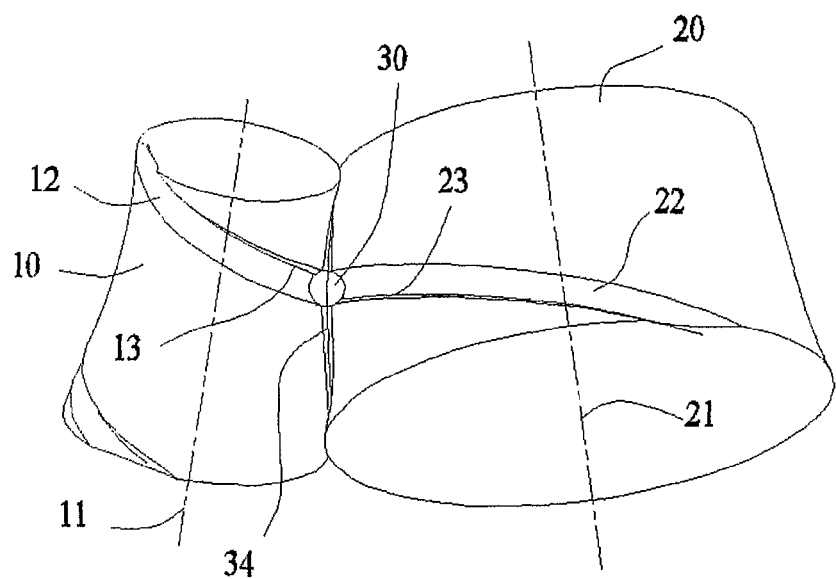
FIG. 5 is a schematic drawing of the same design as the one in FIG. 1 but having only one roller guide track on each body and one roller in coupling position.

In FIG. 5 a simplified schematic drawing of the first wheel 10 and the second wheel 20 coupled by the single roller 30 is shown to illustrate the shape and the characteristic features of the roller guide tracks 12 and 22 developed onto the two respective wheels 10 and 20. This is the same design as the one depicted in FIG. 1. In coupling position the roller guide tracks 12 and 22 turn to face each other and together create a roller coupling channel that contains the single roller 30 shown in FIG. 5. The central line of the roller coupling channel defined by the travel path of the center points of the rollers (in the exemplary case that of the roller 30) is called as roller coupling path and illustrated by reference numeral 34. Two curves: one on the first wheel 10 and the other on the second wheel 20 along which the roller 30 makes contact with the two respective roller guide tracks 12 and 22 are called the rolling curves and are denoted respectively by 13 and 23 in FIG. 5. Obviously, the rolling curves 13 and 23 are part of the respective roller guide tracks 12 and 22. On each wheel the roller guide tracks start and end at the two opposite end surfaces of the associated wheels and in this way these end surfaces limit the surfaces containing the tracks. The rollers enter the roller guide tracks at a first limit surface where the tracks start, then roll along the rolling curves on the roller guide tracks, and finally exit the roller guide tracks at the other limit surface where the tracks end. A so-called engagement factor can be defined which is the number of the rollers 30 that are in simultaneous coupling position on and along the roller coupling path 34. In the case of FIG. 2 the engagement factor is eight while in the case of a similar design depicted in FIG. 7 it is eighteen but in principle, this number can be higher and in certain applications much higher.

Figure 6:
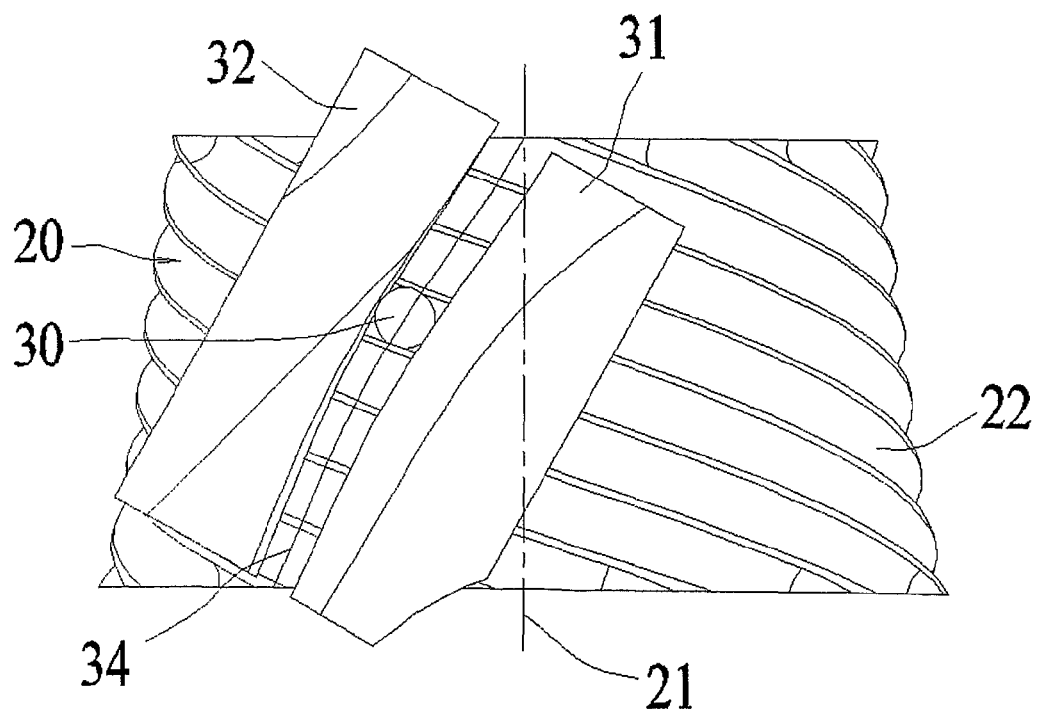
FIG. 6 is a schematic drawing of the same design as the one in FIG. 1 but without the first wheel. 10 shown. Only one roller is shown that is in coupling position inside the roller coupling channel.

FIG. 6 is similar to FIGS. 1 and 2 but for better illustration only the second wheel 20 and a single roller 30 is shown. The roller coupling path 34 is apparent in this Figure along which the center of the roller 30 travels while maintaining its coupling position between the wheels.

Based on FIGS. 1 to 6, the operation and the operating conditions of the roller transmission and gearing mechanism according to the present invention will be explained as follows. In driving operation one of the two wheels is the driving wheel that provides the incoming torque and the other is the driven wheel that receives the transmitted torque. Either the first wheel 10 is the driving wheel and the second wheel 20 is the driven wheel or vice versa. When the driving wheel turns around its own rotational axis, as a result of the incoming torque the roller guide tracks on the driving wheel exert force on the rollers 30. The rollers pass the force on to the roller guide tracks on the driven wheel and thus produce a torque that turns the driven wheel around its own axis of rotation. As the driving and the driven wheels rotate, the rollers 30 retain their coupling positions and roll along the two corresponding roller guide tracks 12 and 22 on the respective wheels 10 and 20. The rollers 30 make contact with the two roller guide tracks at single points and define thereby the two rolling curves 13 and 23. As the rollers 30 roll along the rolling curves 13 and 23, the centres of the rollers 30 travel along the roller coupling path 34. The rollers 30 roll to the end of the roller guide tracks and during their travel they transmit force from the driving wheel to the driven wheel. When they reach the end of the roller guide tracks at the limit surface, they disengage from coupling and exit the tracks. Following that, in most of the cases, they are taken back to the beginning of the roller coupling path 34 at the other limit surface of the wheels through roller recycling path 33. Here, the rollers 30 re-enter the roller guide tracks again and re-establish coupling between the driving wheel and the driven wheel. They start a new coupling cycle wherein they transmit force from the driving wheel to the driven wheel. The cycles repeat perpetually.

It should be noted here based on FIGS. 1 to 6 that in the case of the roller transmission and gearing mechanism according to the present invention the direction of rotation of the driven wheel relative to that of the driving wheel is determined simply by the particular shape and curvature of the roller guide tracks on the surfaces of the wheels. That is, given the same two rotational axes for the driving and driven wheels, when applying a different set of roller guide tracks on the surfaces of the wheels: different in shape and curvature, we can change the direction of rotation of the driven wheel relative to that of the driving wheel. This freedom of freely changing the direction of rotation is not the case at conventional tooth-wheeled gear drives because there the relative direction of rotation for the driving and the driven wheels for a given structural set-up of wheels is fixed. It can only be changed by the introduction of a new idle wheel between the driving and driven wheels causing potential problems such as the expanded size of the system and increased frictional energy losses.

Before describing the conditions for a never-sliding frictionless operation of the roller transmission and gearing mechanism according to the present invention, the large variety of the possible structural designs will be illustrated by showing a few examples.

Figure 7:
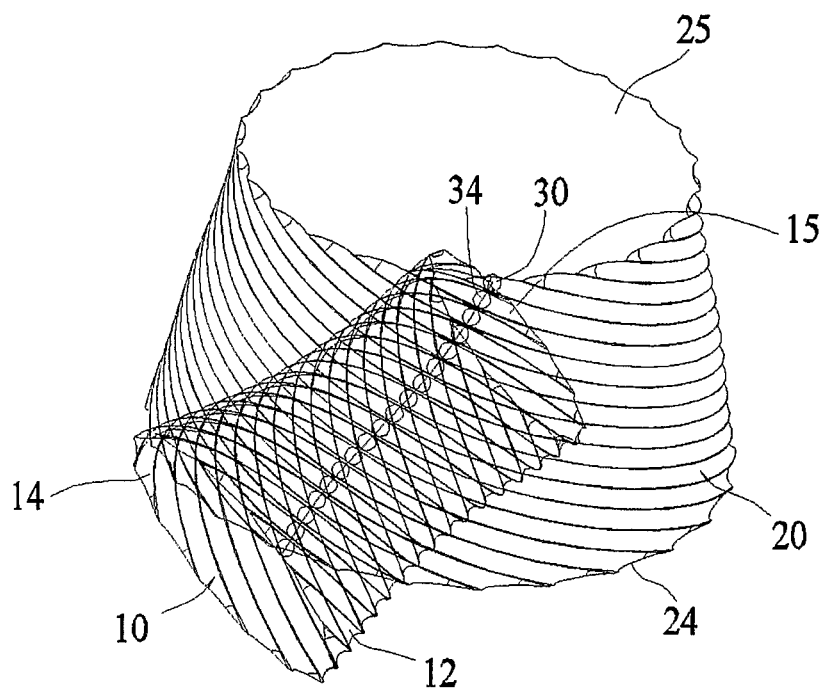
FIG. 7 is a schematic drawing of another example for the basic design similar to that in FIG. 1 with the first wheel 10 made transparent. The rollers in coupling position along the roller coupling path are shown only, but no roller recycling.

In FIG. 7 an embodiment for the roller transmission and gearing mechanism according to the present invention is shown where the axes of the two wheels form skew lines. The first wheel 10 is depicted by using the contour outline of the roller guide tracks 12 but otherwise shown as transparent. The second wheel 20 can be seen behind the transparent first wheel 10 as well as all the rollers 30 that are in coupling position. The centres of the rollers 30 outline the roller coupling path 34. The roller coupling path 34 is defined only between the limit surfaces 24 and 25, and 14 and 15. The roller recycling channel 33 for the rollers 30 is not shown. It is apparent from FIG. 7 that the coupling between the first wheel 10 and the second wheel 20 is established via a large number of rollers 30 viz. eighteen rollers. The number and the size of the rollers 30 is not determined directly by the diameter or the ratio of the diameters of the two wheels 10 and 20 (as it is the case concerning the number of teeth at conventional gear wheel drives) but can be set in a relatively flexible way. In other words, for the same two wheels 10 and 20, various numbers and sizes of rollers 30 can be selected within a relatively wide range of values, and the corresponding roller coupling path and the set of roller guide tracks can be calculated. Note, the larger the number of the rollers 30 is, i.e. at larger engagement factors, the larger the transmissible torque will be. The ratio of the wheel diameters does not directly determine the gearing ratio. In other words, two designs with different wheel diameter ratios can still produce the same gearing ratio. In fact, the shape and the size of the wheels, and the shape, the size and the number of the rollers, together with the shape, the curvature and the number of the roller guide tracks collectively specify the system. These parameters as variables can be varied flexibly within a relatively wide range of values to make up the most optimal structural set-up that satisfies the required system specifications.

Figure 8:
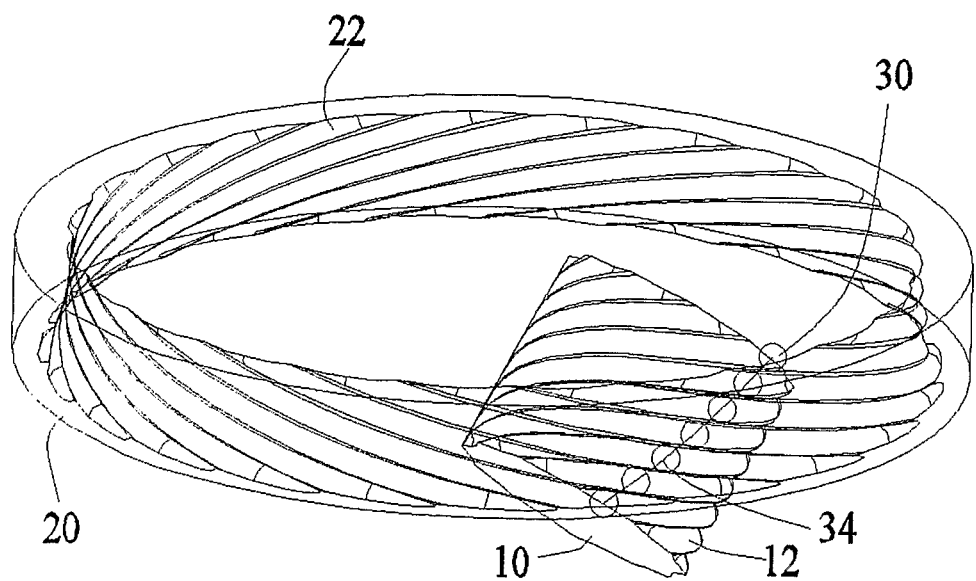
FIG. 8 is a schematic drawing of a design where one of the bodies is a ring with roller guide tracks developed onto its inner surface.
Figure 9:
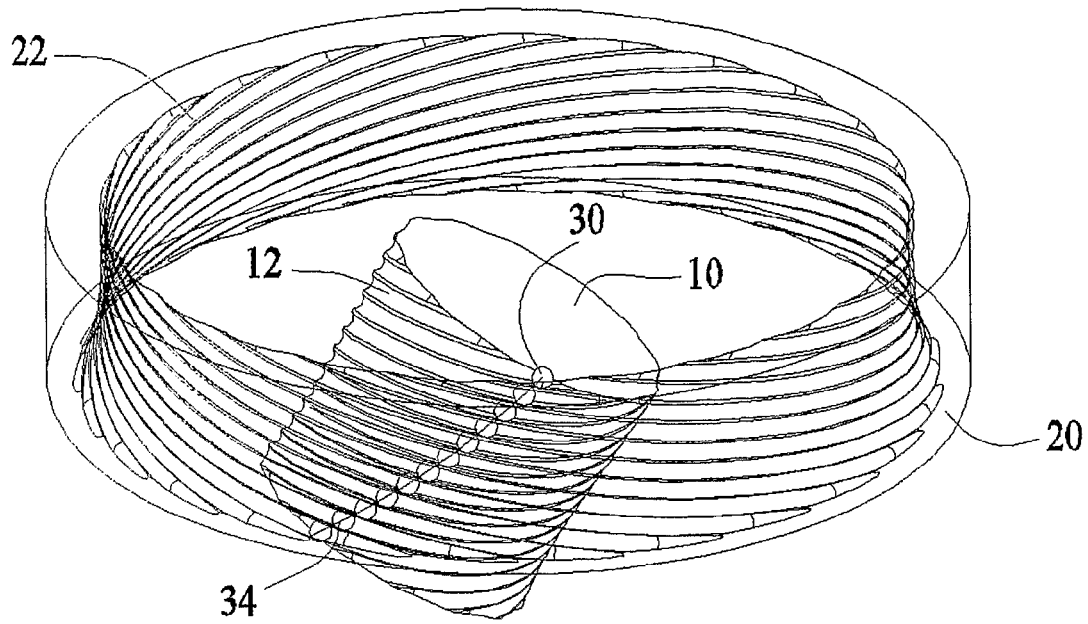
FIG. 9 is a schematic drawing of a design similar to the one in FIG. 8.

FIGS. 8 and 9 show two further examples of the roller transmission and gearing mechanisms according to the present invention where the roller guide tracks 22 on the second wheel 20 are developed onto the inner rotationally symmetric surface of the wheel 20, and the wheel 20 is in fact a ring in this case. The first wheel 10 has its roller guide tracks 12 developed onto its outer surface similarly to the previous embodiments, and it is positioned inside the second ring-shaped wheel 20. In these two figures the second wheel 20 (similar to FIG. 7) is depicted using the contour outline of its roller guide tracks 22 and its outer contours, but otherwise depicted transparent. The rollers 30 in coupling positions and the roller coupling path 34 are also depicted in FIGS. 8 and 9. In the two examples depicted in FIGS. 8 and 9 there is a different number of rollers 30 used and the lengths of the roller coupling paths are different, too. As a result, the transmissible torque as well as the gearing ratio is different for the two set-ups.

Figure 10:
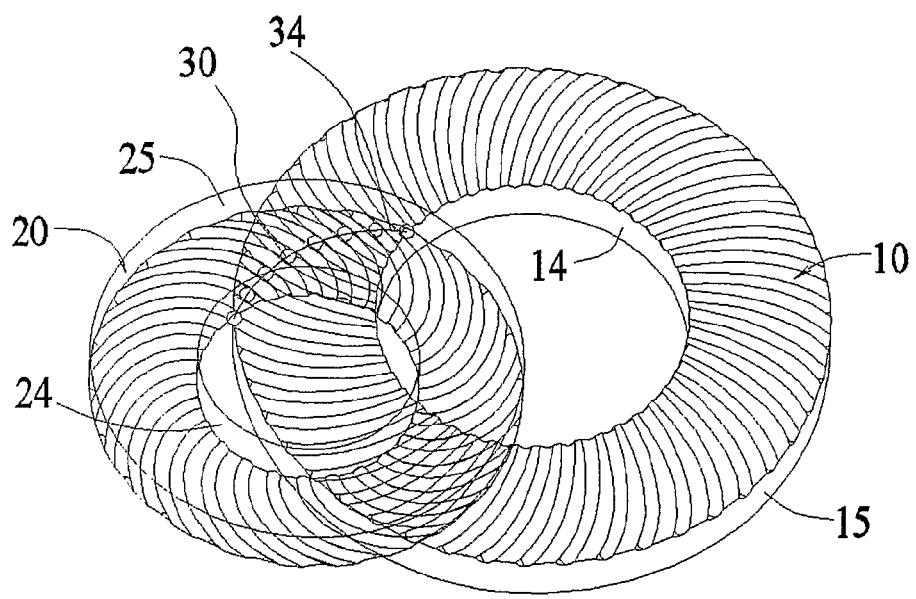
FIG. 10 is a schematic drawing of a design where the rotational axes of the bodies are parallel and the roller guide tracks are developed onto the frontal surfaces of the bodies.
Figure 11:
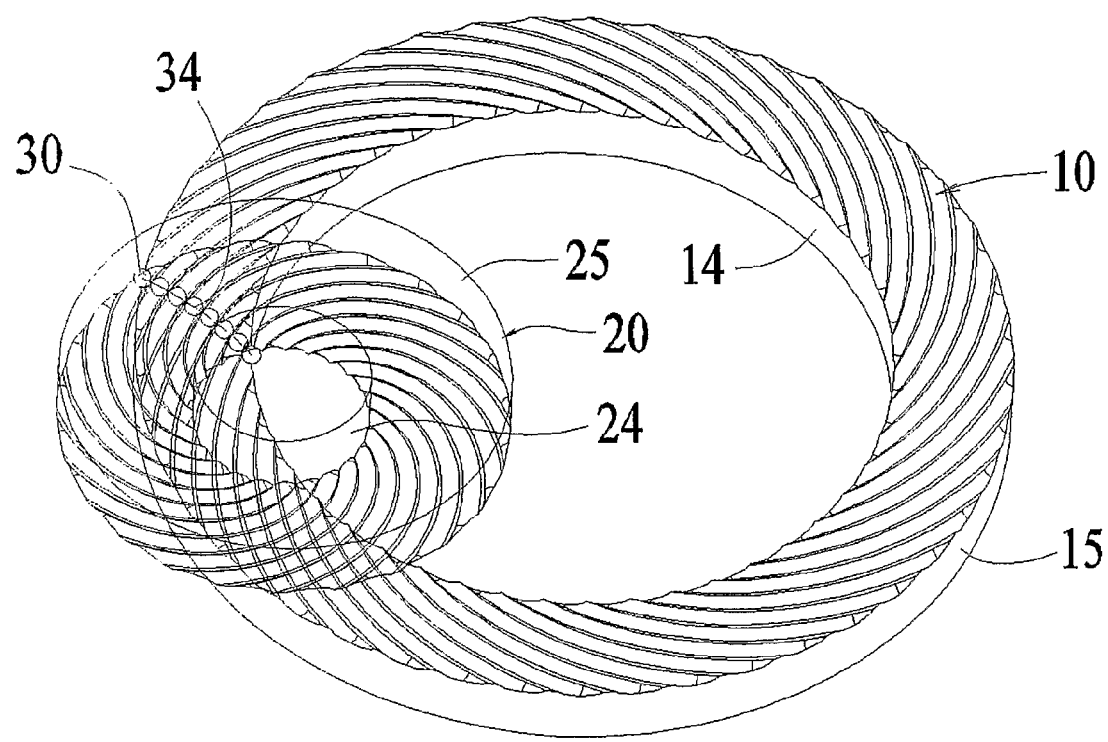
FIG. 11 is a schematic drawing of a design similar to the one in FIG. 10.

FIGS. 10 and 11 show two examples for the roller transmission and gearing mechanisms according to the present invention where the rotational axes of the two wheels 10 and 20 are parallel. The second wheel 20 is depicted using the contour outline of its roller guide tracks 22 and its outer contours and otherwise made look transparent. Thus the rollers 30 and the roller coupling path 34 have become visible through the second wheel 20. In these two examples the roller guide tracks are developed onto the respective frontal surfaces of the wheels 10 and 20. These surfaces facing each other are planes normal to the respective rotational axes of the wheels and are bounded by limit surfaces 14 and 15 and also 24 and 25. The limit surfaces are concentric rotationally symmetric surfaces with axes collinear with the axes of rotation. As a result of their particular curvatures the corresponding roller guide tracks on the two wheels 10 and 20 safely hold the rollers 30 inside the associated roller coupling channels. This means that the rollers 30 are not at risk to go astray in side directions relative to their associated roller coupling channel and, therefore, the application of bafflers or other external devices to keep the rollers in their roller coupling channels is not necessary. The main difference between the two examples shown in FIGS. 10 and 11 is that the driven wheels 20 rotate in different relative directions at these two embodiments compared to the rotational directions of the driving wheels 10. In other words, in one of the examples the direction of rotation for the driven wheel 20 is the same as that of the driving wheel 10 while in the other embodiment it is the opposite. This is achieved by the application of a different system of roller guide tracks: different in shape and curvature.

Figure 12:
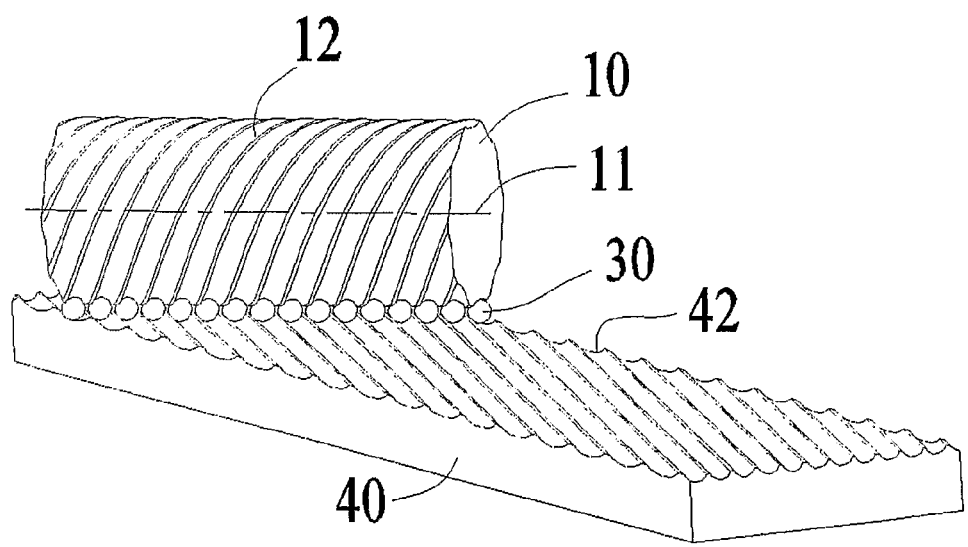
FIG. 12 is a schematic drawing of a design where one of the bodies is a rotationally symmetric body and the other one is a gear rack. No roller recycling is shown.
Figure 13:
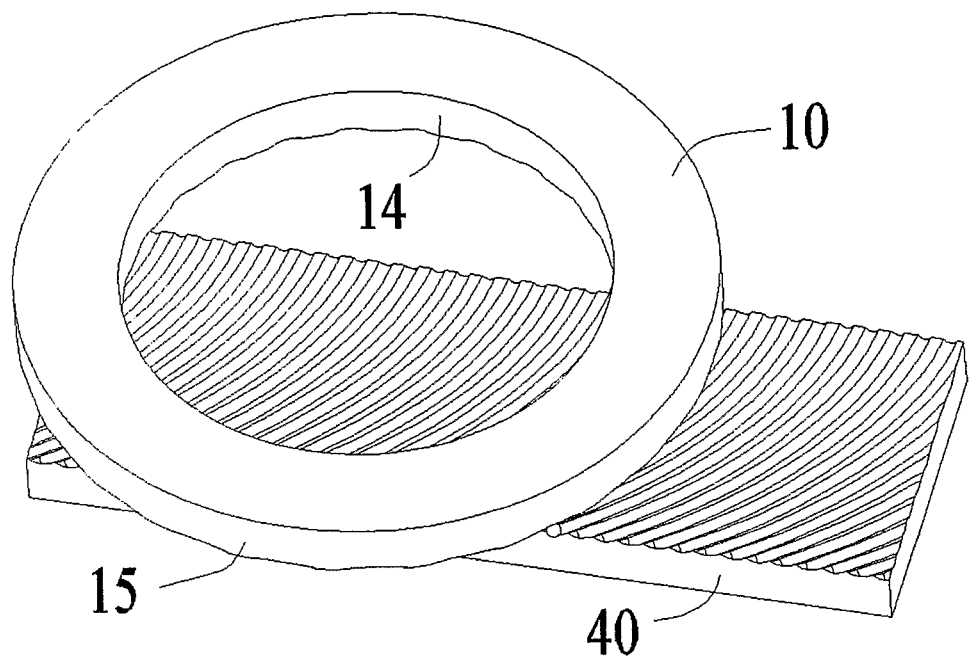
FIG. 13 is a schematic drawing of a design where one of the bodies is a gear rack and the other one is a ring with a rotational axis perpendicular to the plane of the gear rack. The roller guide tracks are developed onto the frontal surface of the ring and onto the side of the gear rack facing each other. No roller recycling is shown.
Figure 14:
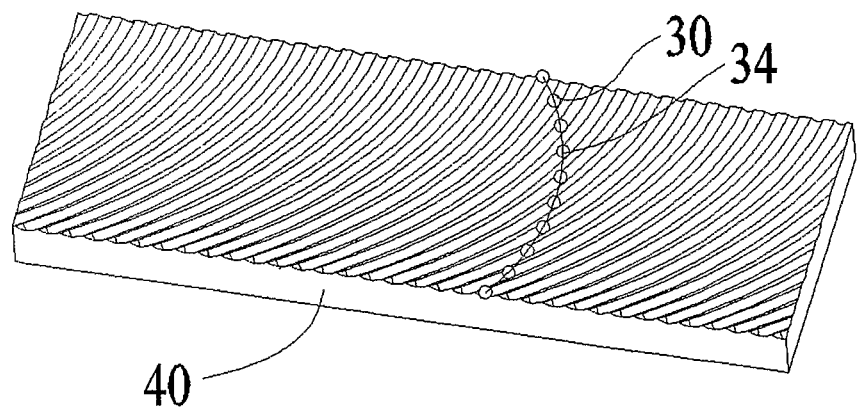
FIG. 14 is a schematic drawing of the same design as the one in FIG. 13 without the ring 10 shown. The rollers in coupling position along the roller coupling path are all fully visible. No roller recycling is shown.

In FIGS. 12 to 14 two further embodiments are shown, one in FIG. 12 and another in FIGS. 13 and 14, where a given rotational motion is transformed into motion along a given line or vice versa. In FIG. 12, similarly to most of the cases shown above, the first wheel 10 has its roller guide tracks 12 developed onto its outer rotationally symmetric surface (not the frontal surface). The wheel 10 rotates around its rotational symmetry axis 11 but the longitudinal position thereof is fixed along the axial direction of the rotational axis. Aligned with the direction of a tangential plane of the wheel 10 there is a gear rack 40 positioned at a small distance away from the wheel 10. The gear rack 40 is set-up to be able to move along a given line parallel to a tangential plane of the wheel 10. There are roller guide tracks 42 developed onto the surface of the gear rack 40 closer to the wheel 10. It can be seen in FIG. 12 that the wheel 10 and the gear rack 40 are coupled by the rollers 30 as the rollers make simultaneous contact with the roller guide tracks 12 of the wheel 10 and the roller guide tracks 42 of the gear rack 40. Considering that the surface of the wheel 10 is curving away from the surface of the gear rack 40 and thus free space is opening up between the two surfaces, the application of bafflers becomes possible to keep the rollers 30 on their roller guide tracks and on the roller coupling path. The bafflers are not shown in FIG. 12 but they would be very similar to those discussed above. The roller recycling track that leads the rollers 30 back from the end of the roller coupling path to its beginning is not shown in FIG. 12 either. Turning the wheel 10, the roller guide tracks 12 on the wheel exert force on the rollers 30 that subsequently exert force on the roller guide tracks 42 on the gear rack 40. This ultimately makes the gear rack 40 move along a given line specified by the set-up of the gear rack. The direction of the movement of the driven gear rack 40 depends, on one hand, obviously on the direction of the rotation of the driving wheel 10 and, on the other hand, also on the particular shape and curvature of the roller guide tracks 12 on the wheel 10 and the roller guide tracks 42 on the gear rack 40. Naturally, the roles of the wheel 10 and the gear rack 40 as driving body and driven body are interchangeable.

FIGS. 13 and 14 show another example for the roller transmission and gearing mechanism according to the present invention where a given rotational motion is transformed into a motion along a given line. Here, however, the rotational axis of the wheel 10 is normal to the plane surface of the gear rack 40 and the roller guide tracks on the wheel are located on the frontal surface of the wheel. FIG. 14 is the same as FIG. 13 except that the wheel 10 has been taken off in order to show the rollers 30 directly as they line up along the roller coupling path 34. The driving wheel 10 in this set-up is similar to those in FIGS. 10 and 11: it is a ring with concentric rotationally symmetric limit surfaces 14 and 15, and the roller guide tracks (not visible) are developed onto its frontal surface similar to those in FIGS. 10 and 11. The roller guide tracks on the ring 10 and the roller guide tracks on the gear rack 40 are coupled, similarly to the cases above, by a set of rollers 30. The rollers 30 are shown directly in FIG. 14. Turning the ring 10 around its vertical axis, the rollers 30 make the gear rack 40 move along a given line specified by the particular set-up of the gear rack 40. The direction of the motion of the driven gear rack 40 depends, on one hand, obviously on the direction of the rotation of the driving wheel 10 and, on the other hand, also on the particular shape and curvature of the roller guide tracks on the wheel 10 and on the gear rack 40.

Figure 15:
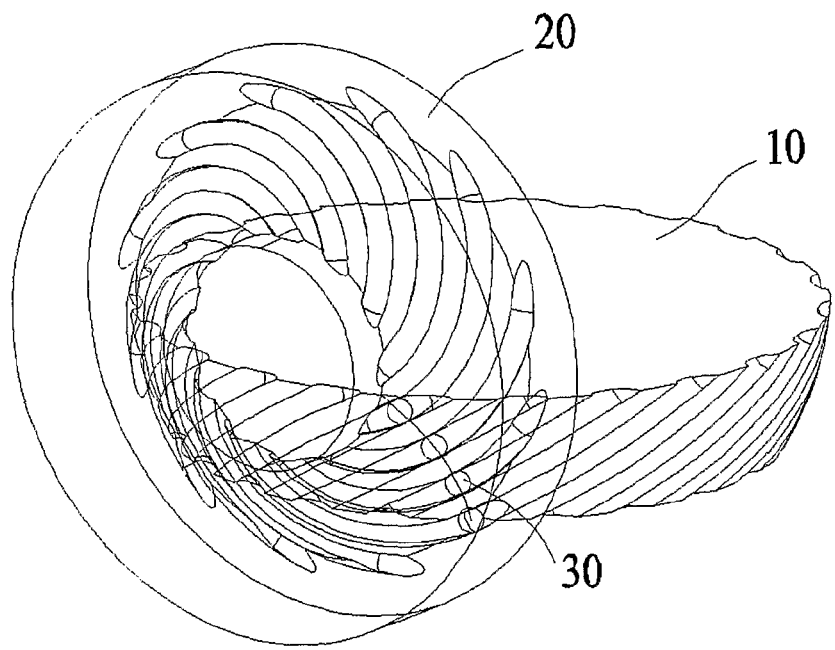
FIG. 15 is a schematic drawing of a design where the two bodies are sphere sections set-up to rotate around intersecting rotational axes.
Figure 16:
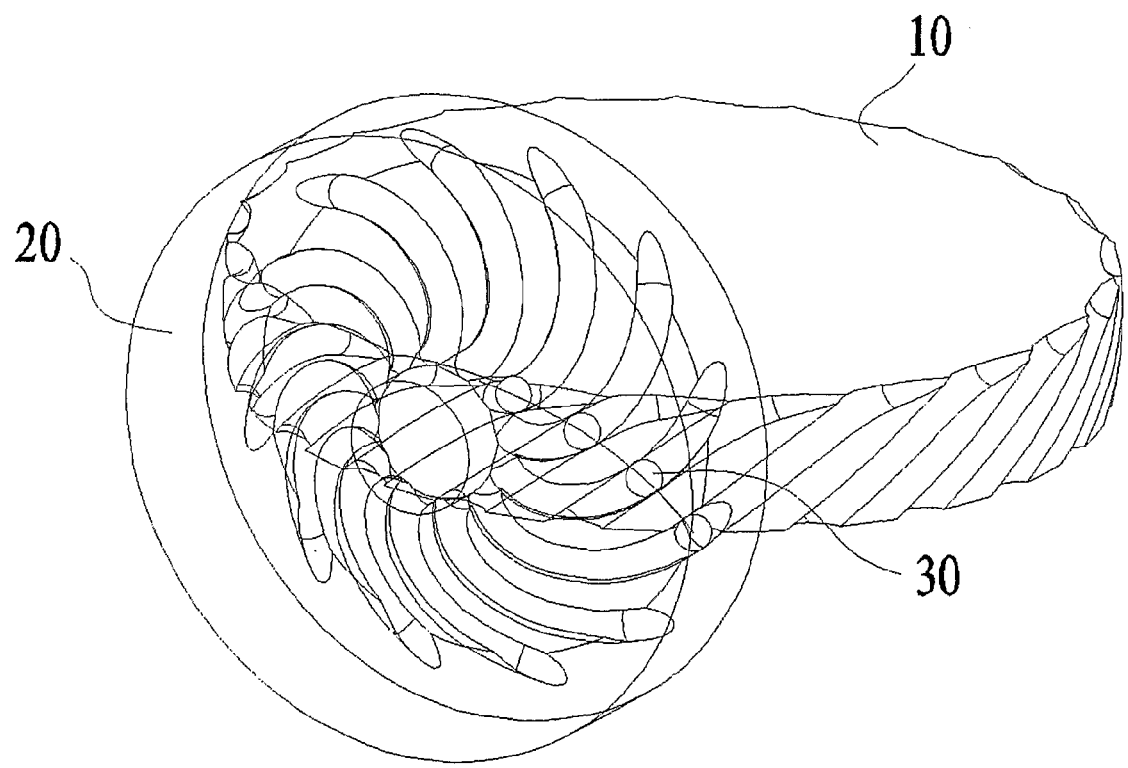
FIG. 16 is a schematic drawing of a design similar to the one in FIG. 15.

In FIGS. 15 and 16 another kind of structural design has been shown, where the rotational axis of the driving wheel 10 and that of the driven wheel 20 intersect each other. The resulting shapes of the track surfaces for the driving wheel 10 and the driven wheel 20 are both sphere sections where the centres of the spheres for both wheels are located at the intersection point of the rotational axes of the driving wheel 10 and the driven wheel 20. In the two embodiments shown in FIGS. 15 and 16, respectively the two transmissions exhibit the same operational features such as the gearing ratio, the maximum transmissible power and the relative directions of rotation even though their structural designs differ in terms of the relative position of the driving wheels 10 with respect to the driven wheels 20. This example highlights the flexibility of the mechanism of the transmission according to the invention, since a variety of structural designs can be used to achieve the same operational features.

Figure 17:
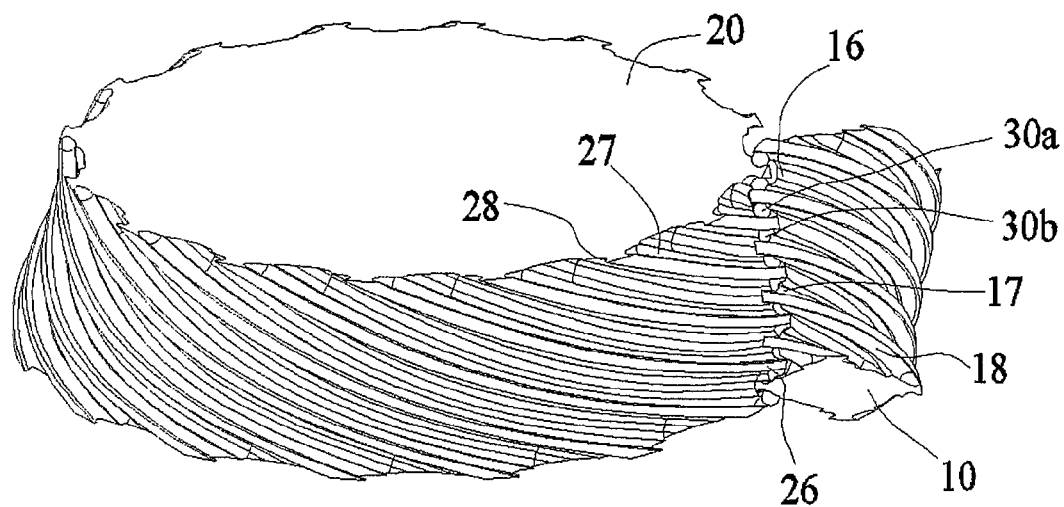
FIG. 17 is a schematic drawing of a design where one-one roller guide track is developed onto both sides of matching grooves and ridges on the driving wheel and the driven wheel.
Figure 18:
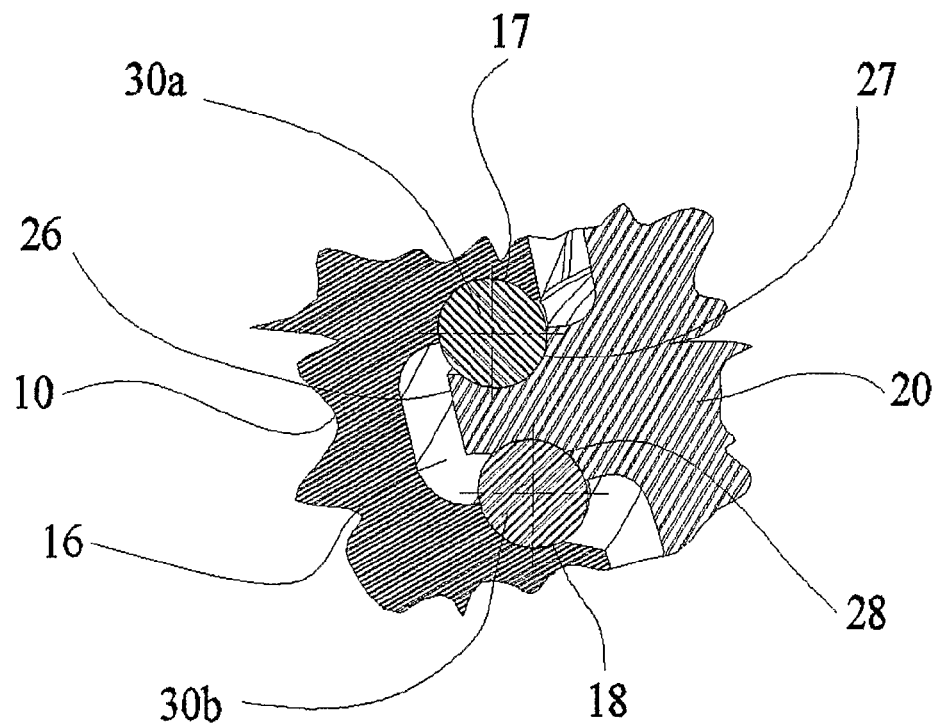
FIG. 18 is a schematic drawing corresponding to the design depicted in FIG. 17 showing the cross-sectional profile of a groove and a ridge with one-one roller guide track developed onto their both sides. The rollers are also shown.

In FIGS. 17 and 18 an example for a new kind of structural design for the roller transmission and gearing mechanism according to the present invention has been shown, wherein both of the driving body 10 and the driven body 20 comprise helical grooves and ridges on their track surfaces similar to conventional screw threads, and the ridges on one body extend freely into the grooved recesses on the other body and vice versa. The roller guide tracks are formed on the two sides of the grooves and ridges on both wheels as illustrated in the cross-sectional view in FIG. 18. In the FIGS. 17 and 18, the two wheels are denoted respectively by reference numerals 10 and 20, wherein groove 16 is defined on the first wheel 10, and two roller guide tracks 17 and 18 are made on the two sides of the groove 16. Similarly, ridge 26 extends out of the second wheel 20 having a profile complementary to the groove 16. Respective, roller guide tracks 27 and 28 are defined on the two sides of the ridge 26 on the second wheel 20. A pair of rollers 30a and 30b are arranged to run along the two roller guide tracks 17, 18 on the two opposingly positioned sides of the groove 16 and of the ridge 26. The roller guide track 17 on the groove 16 on the first wheel 10 and the roller guide track 27 on the corresponding complementary ridge 26 on the second wheel 20 are for the roller 30a on one side of the grooves and ridges, and similarly the roller guide track 18 on the groove 16 and the roller guide track 28 on the ridge 26 are for the roller 30b on the other side of the grooves and ridges. Note, for any given direction of the workload the rollers on only one side of the grooves and ridges, for example those denoted by 30a but not 30b, are in action to transmit force from the driving wheel 10 to the driven wheel 20 while the rollers on the other side of the grooves and ridges, i.e. 30b in this example, are inactive with no force acting on them. On the other hand, when the direction of the workload changes, the roles of the rollers will also be changed and the previously inactive rollers i.e. roller 30b will become active to transmit force from the driving wheel 10 to the driven wheel 20, and the previously active rollers 30a will become inactive with no force acting on them. Thus, if the direction of the workload is always the same such as in the case of elevators or cranes, it is sufficient to use one set of the rollers only that are active in the coupling e.g. rollers 30a and the other ones that are inactive i.e. the rollers 30b can in principle be omitted. On the other hand, when designing a system with variable direction of the workload, both sets of rollers i.e. 30a and 30b must be used even if one of the sets is always redundant at any given time. The same interchange of the rollers takes place when the roles of the wheels 10 and 20 are interchanged, i.e. the previously driving wheel 10 will be the driven wheel and vica versa.

Figure 19:
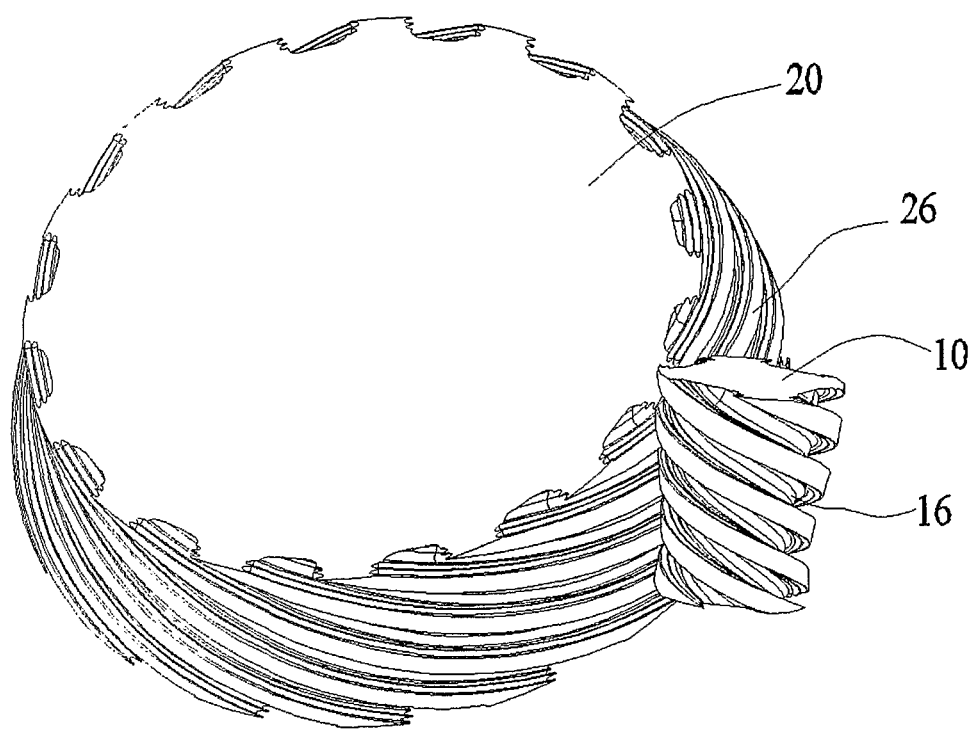
FIG. 19 is a schematic drawing of a design where two pairs of roller guide tracks are developed onto both sides of matching grooves and ridges on the driving wheel and the driven wheel.
Figure 20:
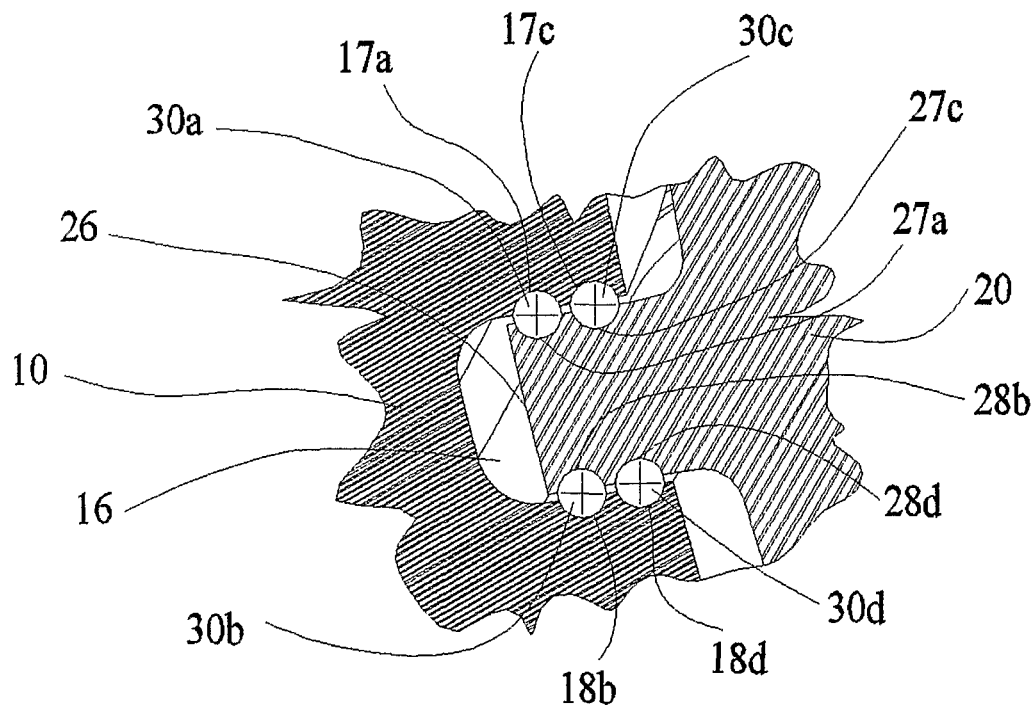
FIG. 20 is a schematic drawing corresponding to the design depicted in FIG. 19 showing the cross-sectional profile of a groove and a ridge with two-two roller guide tracks developed onto their both sides. The rollers are also shown.

It is relatively easy for this design with grooves and ridges to develop a plurality of quasi-parallel arranged roller guide tracks on the surfaces of the driving body and the driven body viz. along the surfaces of the grooves and ridges. The roller guide tracks in this case lead the rollers along a plurality of different roller coupling paths and roller coupling channels. An example for this case is shown in FIGS. 19 and 20 where respective pairs of roller guide tracks 17a and 17c as well as 18b and 18d are developed along each sides of the grooves 16 on the driving body 10 and the corresponding roller guide tracks 27a and 27c as well as 28b and 28d are developed along each side of the ridges 26 on the driven body 20. These roller guide tracks drive four sets of rollers. Roller guide tracks 17a and 27a drive the roller 30a, tracks 17c and 27c drive the roller 30c, tracks 18b and 28b drive the roller 30b and tracks 18d and 28d drive the roller 30d as shown in the cross-sectional view of FIG. 20. It is also apparent from FIGS. 19 and 20 that the roller guide tracks on each groove and ridge in this case are not exactly rotated or parallel shifted copies of one another but they are separate independent solutions of respective kinematical equations in their own rights.

This type of design for the roller transmission and gearing mechanism with grooves and ridges on the track surfaces of the driving body and the driven body has a few special features and advantages when compared to other designs in the present invention. For example, the force acting perpendicular to the axes of the wheels and striving to push them apart is relatively small in this case. Also, since the curvature of the roller guide tracks on the driving wheel and on the driven wheel are typically opposite in sign, the rollers are not at risk of going astray in side directions and, therefore, there is no need for bafflers or other external devices to keep the rollers in their respective roller coupling channels. It is relatively easy in this design to reduce the width of the roller guide tracks at one of the bodies until it will be as narrow as a single line so as to constitute the corresponding rolling curve. This is typically very difficult or impossible to do in most of the cases of the other designs that have no grooves and ridges on their track surfaces. It is also relatively easy to use small size rollers here such as a single millimeter of diameter or even smaller and to develop a relatively large number of roller guide tracks such as 5-10 of them or even more on the surfaces of the grooves and ridges. Taking this case of small-size rollers to the extreme, this design unlike the others can also be set-up to use microscopically small rollers and microscopically narrow roller guide tracks as it is discussed in detail below. Also, this design features relatively high engagement factors.

Figure 21:
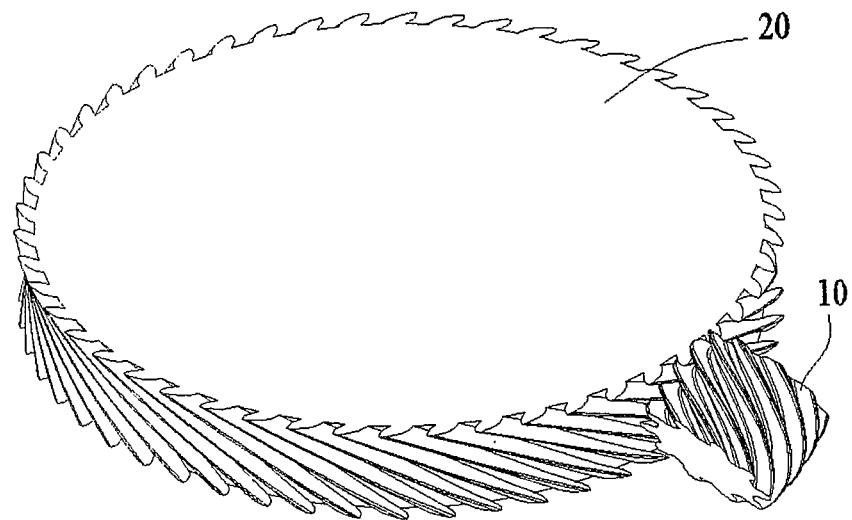
FIG. 21 is a schematic drawing of a design where a large number of microscopically small rollers are used and the corresponding rolling curves determine the surfaces of both sides of the matching grooves and ridges on the driving wheel and the driven wheel.
Figure 22:
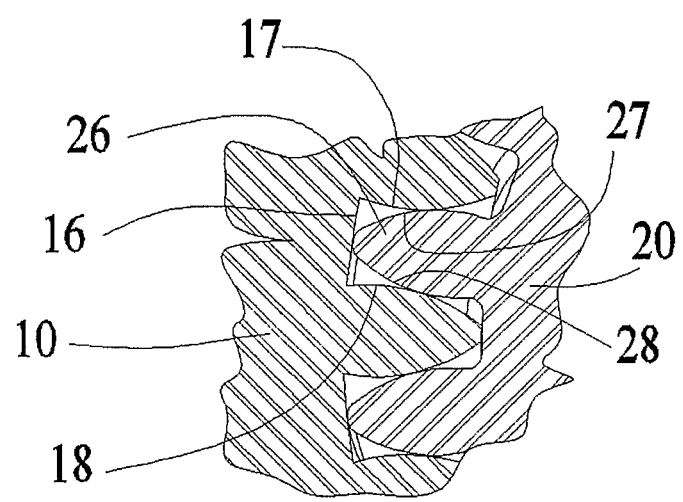
FIG. 22 is a schematic drawing corresponding to the design shown in FIG. 21 and showing the cross-sectional profile of two-two grooves and ridges. The rollers are too small to be shown in the Figure while the roller guide tracks collapsing into the single-line rolling curves determine the full profiles of the grooves and ridges.

A special case for the above designs with grooves and ridges is depicted in FIGS. 21 and 22 where a very large number of microscopically small rollers are used with each roller having a diameter of a few micrometers only. In fact, a "reservoir" of the rollers is used that has a macroscopically large volume such as a liter of rollers meaning that the number of rollers in the reservoir is in the order of thousands of billions or even more. The individual rollers are obviously not visible in the Figures because they are too small to see but the volume of rollers can be imagined as a certain kind of "lubricating liquid" in which the coupling area of the wheels viz. the volume of the roller coupling channels is immersed. The roller guide tracks corresponding to the rollers are microscopically narrow and practically collapse into the single lines of the rolling curves. They are also very large in number, tightly spaced and cover the entire surface of both sides of the grooves and ridges in fine detail. In other words the full profile as given in the cross-sectional view in FIG. 22 as well as the shape and curvature of the grooves and ridges on the driving body 10 and the driven body 20 as shown in FIG. 21 are determined by the ensemble of the microscopically narrow roller guide tracks. It may be possible to use a composite mixture of spherical objects suspended in a lubricant liquid as described e.g. in U.S. Pat. No. 5,549,743. In FIG. 22 in particular, surfaces 17 and 18 of the groove 16 on the driving wheel 10 as well as the corresponding surfaces 27 and 28 of the ridge 26 on the driven wheel 20 define a very large number of tightly spaced microscopically narrow roller guide tracks, and the cross-sectional profiles of these tracks are so extremely narrow that they in fact nearly collapse into the single points of the rolling curves. The curves determined by the lines of the single points of the rolling curves in the cross-sectional view in FIG. 22 add up and thus constitute the profiles of the grooves and ridges. Note, as opposed to what FIG. 22 seemingly suggests, the grooves and ridges are never in direct contact with one another but are separated by a very thin film of the rollers, again, not visible in FIG. 22 due to their thin size. Also note, the conditions characteristic to the roller transmission and gearing mechanism according to the present invention (which will be described and defined in detail at a later part of the present specification, whereby sliding between the opposite surfaces cannot take place) are still present and ensure that the rollers carry out pure rolling motion when being in coupling position between the driving body 10 and the driven body 10 resulting in extremely small frictional energy losses. In this particular case, there is no need for a roller recycling device as described earlier because the driving body and the driven body are making contact with one another only while immersed in a reservoir of rollers. All what needs to be done is to ensure that a sufficient amount of roller "liquid" be constantly available to "lubricate" the system.

Figure 23:
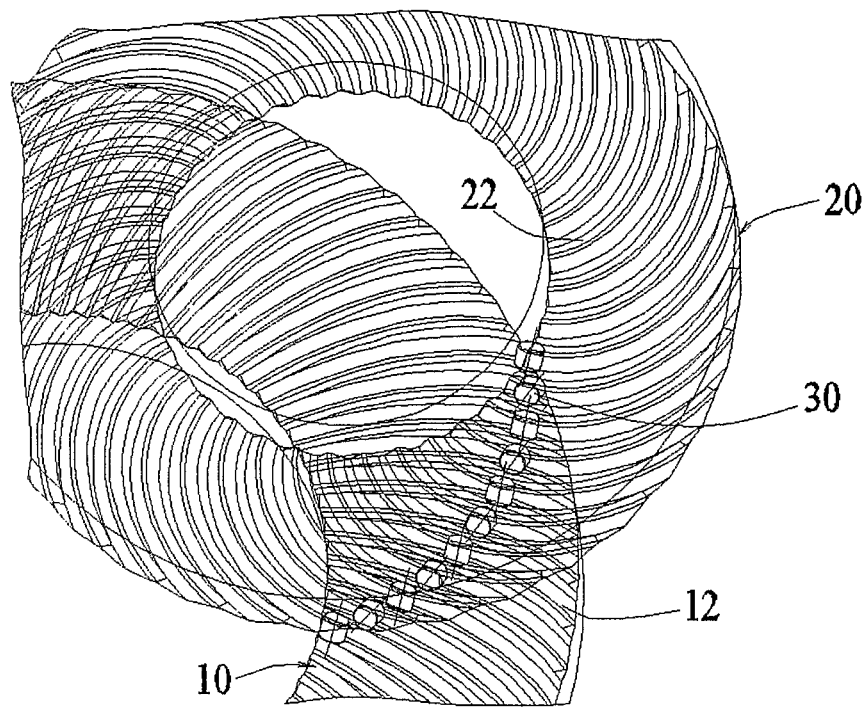
FIG. 23 is a schematic drawing of a design where cylindrical rollers are used.
Figure 24:
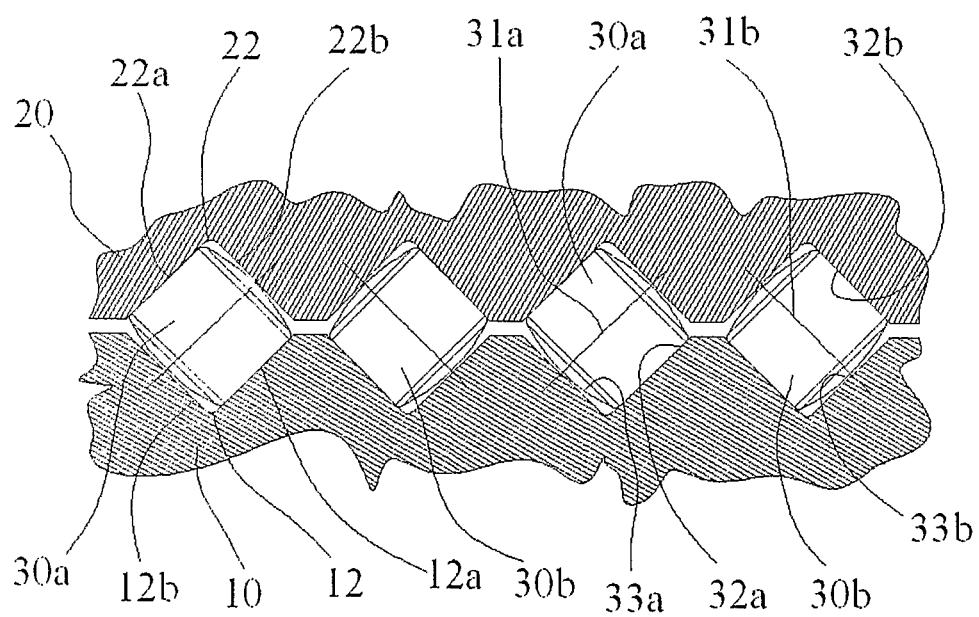
FIG. 24 is a schematic drawing corresponding to the design shown in FIG. 23 showing the cross-sectional profile of the roller guide tracks on the two wheels. The cylindrical rollers in the roller guide tracks are also shown.

Returning again to rollers with normal size, it should be noted that in the foregoing embodiments of the roller transmission and gearing mechanism according to the present invention the rollers were spherical balls. In fact, however, other rotationally symmetric bodies such as cylindrical rollers and barrel rollers can also be used as rollers. Cylindrical and barrel rollers are typically useful in the case of exceptionally large workloads. Such an embodiment is shown in FIGS. 23 and 24 where the rollers 30 coupling the roller guide tracks 12 and 22 are cylindrical rollers with spherically shaped fronts. FIG. 24 illustrates that the rollers 30 can be divided in two groups i.e. rollers 30a and 30b, having axes 31a and 31b, respectively. Their cylindrical surfaces 32a and 32b are limited by spherical caps 33a and 33b. The first driving wheel 10 and the second driven wheel 20 have parallel rotational axes as shown in FIG. 23. FIG. 24 shows that the cross-sectional profiles of the two roller guide tracks 12 and 22 on both of the wheels 10 and 20 each include two straight lines 12a and 12b for the roller guide track 12 as well as 22a and 22b for the roller guide track 22. One half of the rollers such as the rollers 30a at their cylindrical surfaces 32a make contact with one of the straight sides 12a of the roller guide track 12 on the wheel 10 and 22a of the roller guide track 22 on the wheel 20. The angle between the axes 31a of the rollers 30a and the rotational axis of the wheel is the same for all of these rollers 30a.

The other half of the rollers 30b at their cylindrical surfaces 32b make contact with the other straight side 12b of the roller guide tracks 12 on the wheel 10 and 22b of the roller guide track 22 on the wheel 20. The angle between the axes 31b of these rollers 30b and the axis of rotation of the wheel is the same for all of these rollers 30b but different than that for the first half of the rollers 30a. For a given direction of the workload only one half of the rollers such as e.g. 30a are active in coupling and transmitting force between the two wheels and the other half 30b thereof are inactive with no force acting on them. For the opposite direction of the workload the second half of the rollers 30b are active and the first half 30a thereof are inactive. In the case of a design where the direction of the workload never changes, it is enough to use only one set of rollers only that are active in coupling such as e.g. rollers 30a and only one corresponding straight line in the profile of the roller guide tracks such as e.g. 12a on the wheel 10 and 22a on the wheel 20 will then contact the rollers 30a. In this case, all the rollers contact the wheels at the single given straight side of the profile and all contribute to coupling in the same way all the time. The frontal surfaces of the rollers such as 33a for the rollers 30a and 33b for the rollers 30b are typically never in direct contact with the wheels and even if they occasionally and temporarily get into contact at the axial apex points of the rollers both the transmitted force and the strength of such a coupling will remain negligibly small. The lines 12a and 22a or 12b and 22b of the profiles of the roller guide tracks where the main contacts with the rollers occur need not be necessarily straight in every embodiment, and in some special applications they can have a slight curvature depending on the workload applied and on actual strength requirements of the design. The mechanism is set up similarly for the cases of barrel rollers too.

Figure 25:
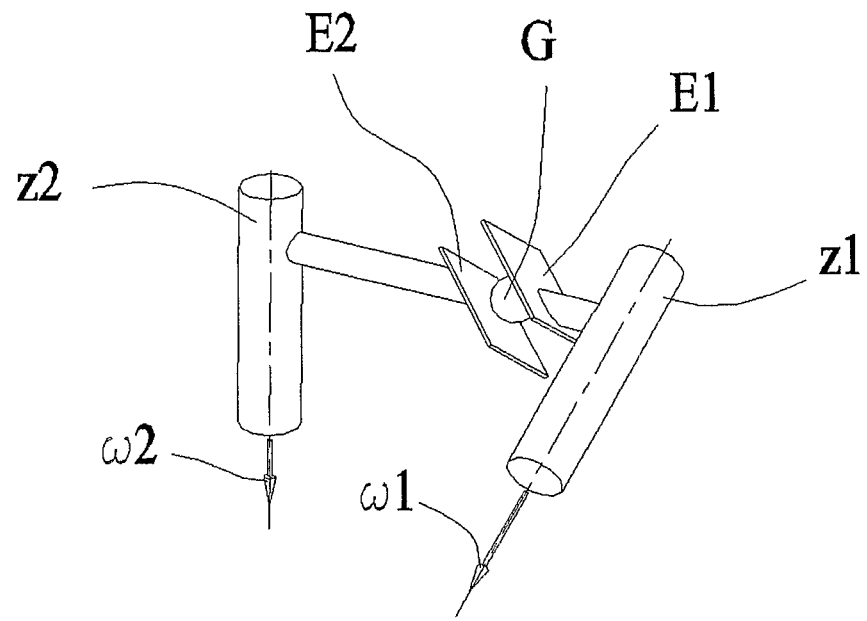
FIG. 25 is the first schematic drawing to illustrate the principle of the torque transmission in the roller transmission and gearing mechanism according to the present invention. In the example depicted in this Figure two rotationally symmetric bodies z1 and z2 are used with their rotational axes set at an arbitrary angle.

In connection with FIGS. 25 to 29 certain basic characteristic properties of the invention will be explained by showing a schematic outline of the characteristic forces acting between the roller guide tracks and the rollers as torque is transmitted from the driving body to the driven body. In FIG. 25 a driving body z1 is shown rotated with an angular velocity of ω1. Part of the driving body z1 is a roller guide track that is in contact with roller G. The roller is represented by a spherical ball. The roller guide track and the roller G are in contact with each other at a single point that forms part of the rolling curve defined on the driving body z1. At this point the plane tangential to the surface of the roller guide track and the plane tangential to the surface of the roller G coincide. This tangential plane is denoted by reference symbol E1 and represented by a small quadrangle in the drawing.

Figure 26:
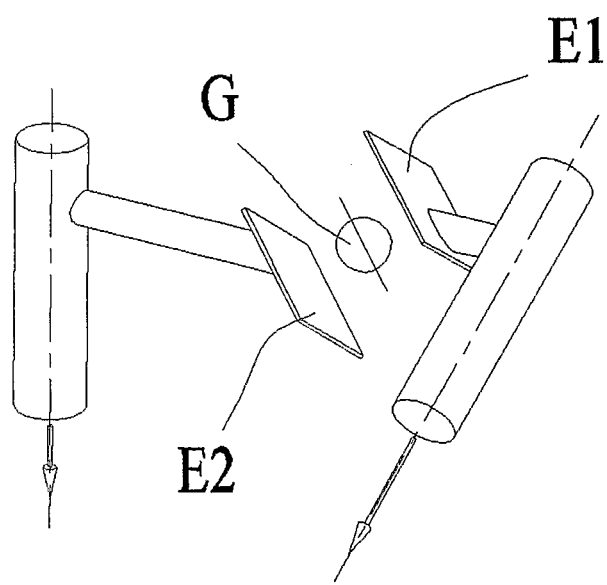
FIG. 26 is the second schematic drawing to illustrate the example in FIG. 25.
Figure 27:
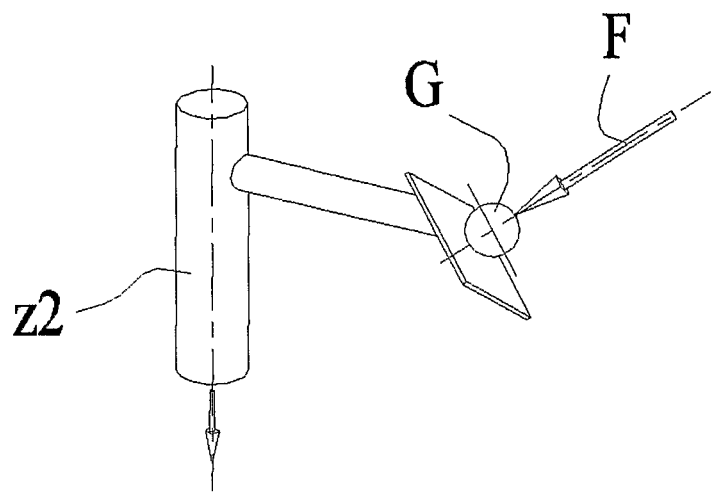
FIG. 27 is the third schematic drawing to illustrate the example in FIG. 25.
Figure 28:
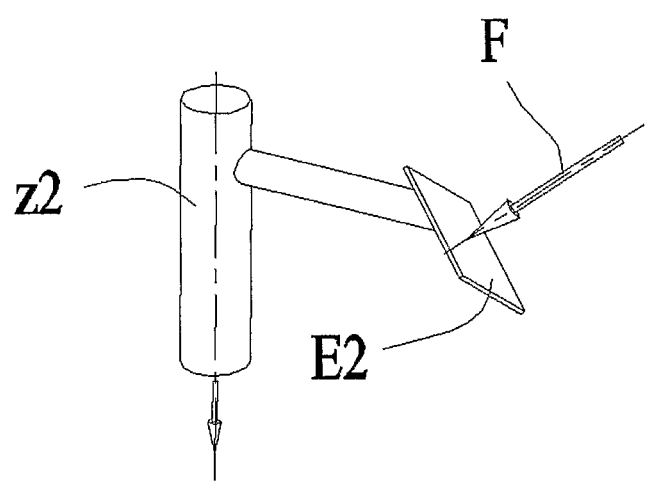
FIG. 28 is the fourth schematic drawing to illustrate the example in FIG. 25.

Similarly, in FIG. 25, driven body z2 is rotated with an angular velocity of ω2. In the most general case the rotational axis of the driven body z2 is a skew line relative to the rotational axis of the driving body z1. The roller guide track on the driven body z2 is in contact with the roller G at one single point. This is a point on the rolling curve on the driven body z2 and at this point the plane tangential to the surface of the roller guide track and the plane tangential to the surface of the roller G coincide. The common tangential plane for the roller and the roller guide track is represented in FIG. 25 by a small quadrangle and is denoted by reference symbol E2. FIG. 26 corresponds to FIG. 25 but for the sake of easier illustration the tangential planes E1 and E2 are shifted away parallel from the contact points. In the case of pure rolling motion with no sliding and no frictional energy losses, the forces acting on the roller G should point exactly to the center of the roller G. In such a case the driving body z1 can be represented by a single force vector F acting on the roller G at the contact point of the roller G and the roller guide track, and pointing towards the center of the roller G as it is shown in FIG. 27. It follows that the force vector F is normal to the tangential plane E1. Following the same argument on no sliding and no frictional energy losses it is apparent that the force acting on the driven body z2 should also be the same force vector F as it is shown in FIG. 28. Force vector F is acting on the driven body z2 at the contact point of the roller G and the roller guide track on the driven body z2. It also follows that the force vector F must be normal to the tangential plane E2, too.

Figure 29:
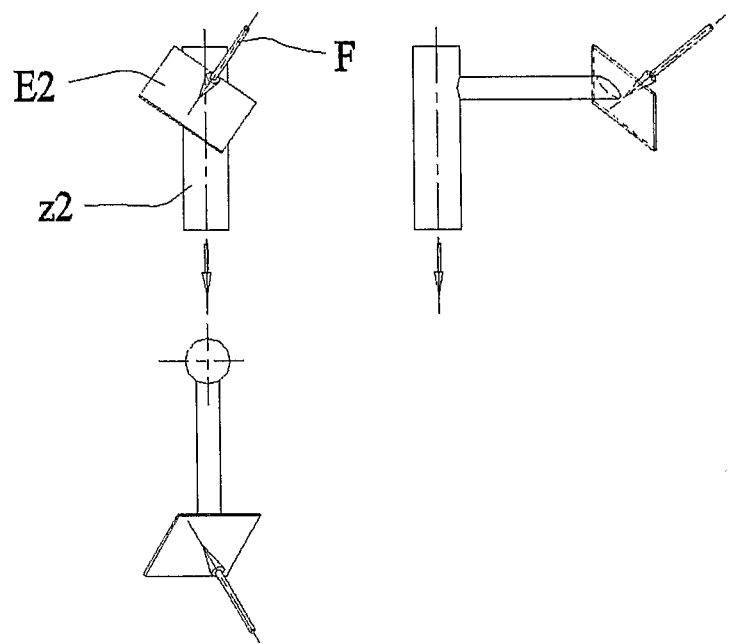
FIG. 29 is the fifth schematic drawing to illustrate the example in FIG. 25. Views in the three main directions are shown.

FIG. 29 shows the front-, top- and side-views of the driven body z2 based on FIG. 28 to illustrate the torque arising on the driven body z2 as a result of the force vector F acting on the driven body z2. In the most general case, force vector F is acting along a line that is a skew line with respect to the rotational axis of the driven body z2. The vector component of the force vector F that is in the plane perpendicular to the rotational axis of the driven body z2 multiplied by the distance between this vector component of force vector F and the rotational axis of the driven body z2 gives the torque arising on the driven body z2. In the most general case, the force vector F may also have a vector component acting parallel to the rotational axis of the driven body z2. This vector component of the force vector, however, bears no significance in terms of the basic operation of the roller transmission and gearing mechanism according to the present invention because it does not produce torque. This component of the force vector only provides extra load and stress acting on the driven body z2 that is counteracted by a force acting on the bearings of the driven body z2.

Figure 30:
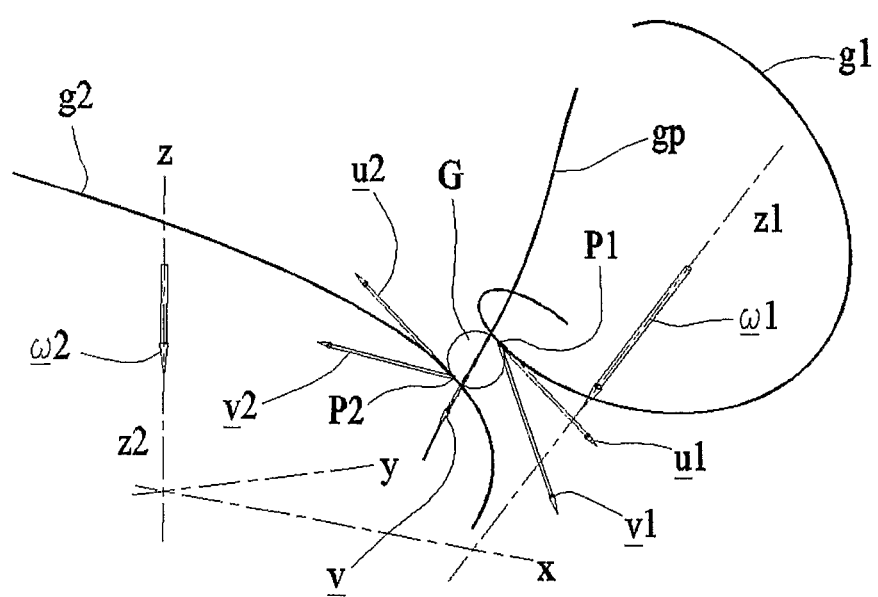
FIG. 30 is a schematic drawing of the kinematics of the roller transmission and gearing mechanism according to the present invention. One roller, its corresponding roller coupling path and the two rolling curves are shown as well as the various velocities and angular velocities characteristic to the system.

Above we have shown the forces and the torque acting on the driven body z2 considering a single roller G in a given coupling position along the roller coupling path. In FIG. 30 the kinematics of the mechanism considering the same roller G in the same position has been illustrated. The driving body z1 has an angular velocity vector of ω1. The contact point P1 of the roller G and of the roller guide track on the driving body z1 has a velocity vector of v1. Contact point P1 is part of the rolling curve on the roller guide track of the driving body z1 and its velocity vector v1 is therefore tangential to the rolling curve. Similarly, the driven body z2 has an angular velocity vector of ω2. The contact point P2 of the roller G and of the roller guide track on the driven body z2 has a velocity vector of v2. Contact point P2 is part of the rolling curve on the roller guide track of the driven body z2 and its velocity vector v2 is therefore tangential to the rolling curve. The center of the roller G has a velocity vector of v that in the case of pure rolling motion with no frictional energy losses equals the arithmetic average of the velocity vectors v1 and v2, that is v=½*(v1+v2). We can also look at the kinematics from the point of view of the coordinate system attached to the center of the roller G. In this case the velocity vector u1 is the velocity vector of the contact point P1 and the velocity vector u2 is the velocity vector of the contact point P2. Since the roller G in its own coordinate system carries out a simple circular motion, the velocity vectors u1 and u2 are of equal magnitude and perpendicular to the radius vectors pointing respectively to the contact points P1 and P2. Also since the contact points P1 and P2 are located diagonally opposite of one another on the surface of the roller G velocity vectors u1 and u2 are parallel and pointing in the opposite directions, that is u1=−u2.

FIG. 30 also shows one of the rolling curves g1 created from the continuous ensemble of contact points P1 between the roller G and one of the roller guide tracks of the driving body z1. The rolling curve g1 obviously follows the corresponding roller guide track on the driving body z1 and the roller G rolls along this rolling curve while in contact with the driving body z1. Similarly, FIG. 30 also shows rolling curve g2 created from the continuous ensemble of contact points P2 between the roller G and one of the roller guide tracks of the driven body z2. The rolling curve g2 obviously follows the corresponding roller guide track on the driven body z2, and the roller G rolls along this curve while in contact with the driven body z2. Note, the roller G rolls simultaneously along the two rolling curves g1 and g2 located on the respective driving body z1 and driven body z2. While the contact points P1 and P2 move along the respective rolling curves g1 and g2, the center point of the roller G travels along a different curve called the roller coupling path denoted as gp in FIG. 30. The roller coupling path gp as well as the rolling curves g1 and g2 located on the corresponding roller guide tracks on the driving body z1 and the driven body z2 are of finite length. The starting and the ending points of the curves and of the tracks are located at the two limit surfaces of the driving and driven bodies, and these points determine the respective entry and exit locations for the rollers G into the roller guide tracks of the driving and driven bodies z1 and z2. These are the start and end points for the rollers G where they respectively establish and terminate coupling between the driving and the driven bodies z1 and z2. It should be noted that the contact points P1 and P2 move in synchrony along the respective rolling curves g1 and g2 and, in particular, they move without any sliding.

In FIG. 30 it is apparent how different in shape and position the two rolling curves g1 and g2 are. At the same time it follows from the analysis above that the same kinematical conditions for non-sliding frictionless motion apply to both of the curves and, therefore, the tangential planes (i.e. E1 and E2) to the two curves at the simultaneous contact points P1 and P2 are always parallel. The velocity vectors u1 and u2 point in the direction of the two tangential planes E1 and E2 and are therefore parallel themselves; moreover, they have the same magnitude and opposite in direction. Furthermore, since the roller G enters the two roller guide tracks on the driving and driven bodies z1 and z2 at the same time and also exits them at the same time, the roller G spends exactly the same time on the two rolling curves g1 and g2. Based on the same magnitude for the velocities u1 and u2 at which the two contact points for the roller G are travelling along the rolling curves and also based on the same time the roller G spends on the rolling curves, it follows that even though the two rolling curves g1 and g2 are apparently of very different shape and position they must have exactly the same lengths.

Using the kinematical conditions for frictionless motion and also based on the specific requirements for the structural design including in particular the direction of the rotational axes of the driving and driven bodies z1 and z2, and also the number and size of the rollers G, the shape and size of the driving and driven bodies z1 and z2, the roller coupling path gp and the rolling curves g1 and g2 and the corresponding roller guide tracks on the driving and driven bodies z1 and z2 can be calculated. This means that the roller transmission and gearing mechanism according to the present invention can be designed and dimensioned in full detail.

Figure 31:
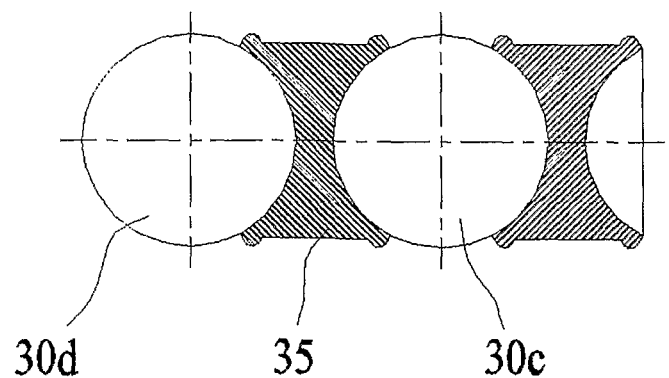
FIG. 31 is a schematic drawing showing spacers between the rollers.
Figure 32:
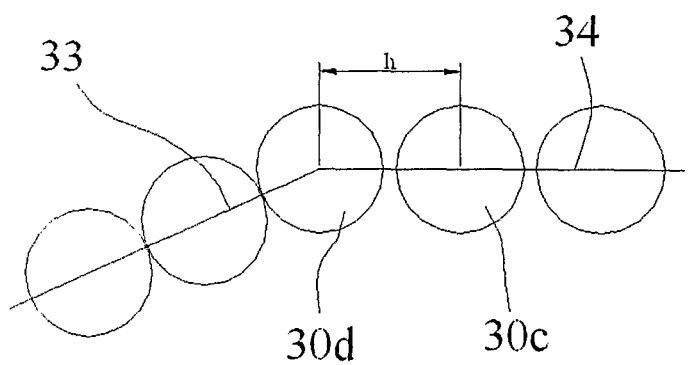
FIG. 32 is a schematic drawing of a line of rollers representing the angle set-up between the roller coupling channel and the roller recycling channel.

Reference will be made now to FIGS. 31 and 32 and to the way how the rollers are returned after having disengaged from coupling. As it is apparent in FIGS. 1, 2 and 6, after the rollers 30 have reached the end of the roller coupling path 34 in the roller coupling channel and have disengaged from coupling by exiting the channel, they are guided back to the beginning of the roller coupling channel through the roller recycling channel 33. The rollers 30 in the roller coupling channel are driven by the roller guide tracks 12 and 22 and follow each other at a finite non-zero distance. The main reason for the non-zero gapping between the rollers 30 is that the direction of the roller guide tracks 12 and 22 and the direction of the roller coupling path 34 at the points of the rollers involves an angle that is not a right angle. The velocity of each roller 30 within the roller coupling channel is determined by the roller guide tracks 12 and 22 rotating with the wheels 10 and 20, respectively. Obviously, as the angular velocities of the two wheels 10 and 20 change, the velocities of the rollers 30 change as well. On the other hand, for given constant angular velocities for the wheels, the velocities of the rollers 30 in coupling position within the roller coupling channel are close to constant throughout the roller coupling channels and are also very similar for each roller. Inside the roller recycling channel 33, however, as it is illustrated in FIGS. 1 and 2 the movement of the rollers 30 is not controlled by any external device and the rollers move because they push each other along the roller recycling channel 33. As a result, the distance between the rollers 30 disappears and the rollers form a continuous line in the roller recycling channel 33. Also, once the continuous line is formed, the rollers 30 are bound to move at the same exact velocity in the roller recycling channel 33 as they are in direct contact with one another. Nevertheless, since the movement of the rollers is not controlled externally, there can be temporary opening of gaps and collisions occurring between the rollers that can introduce potentially hectic uncontrolled movements for the rollers and noise in the system. This can be particularly the case in the area where the rollers make their transition from the roller coupling channel to the roller recycling channel (or vice versa from the roller recycling channel to the roller coupling channel) where external control and gapping between the rollers suddenly disappears (or appears). In the examples below we provide a few solutions to this problem where it is ensured that the movements of the rollers remain smooth and controlled in both the roller coupling channel and the roller recycling channel, and whereby a continuous feed of rollers into the roller coupling channel is provided.

One idea is, as shown in FIG. 31, to introduce spacers 35 between adjacent rollers 30c and 30d to keep a constant distance therebetween. The length of the spacers 35 is equal to the distance between the rollers measured while being in coupling position inside the roller coupling channel. The spacers 35 are placed between the rollers 30d and 30c and follow them all the way along their entire journey in the system.

An alternative idea is shown in FIG. 32. Here, the distance between the centres of the consecutive rollers 30c and 30d in the roller recycling channel is equal to the diameter of the rollers 30c and 30d as long as the rollers contact each other and in the roller coupling channel the distance h between the rollers equals to the diameter of the rollers D plus the gaps between the rollers in the roller coupling channel. Thus the velocity of the rollers within the roller coupling channel should be higher than the velocity of the rollers in the roller recycling channel. In order to bring the higher velocity down to the level of the lower one we have introduced an angle between the beginning section of the roller recycling channel and the ending section of the roller coupling channel as shown schematically in FIG. 32 such that the cosine of this angle is equal to the ratio of the velocities of the rollers in the respective sections of the channels. In this way a smooth transition for the rollers from the roller coupling channel to the roller recycling channel is ensured. Similarly, an angle should be provided between the ending section of the roller recycling channel and the beginning section of the roller coupling channel, wherein the cosine of this angle is equal to the ratio of the velocities of the rollers within the respective sections of the channels.

Figure 33:
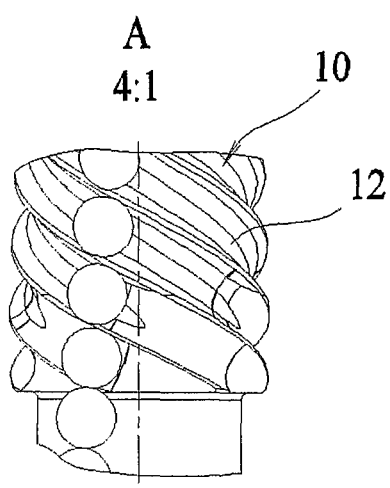
FIG. 33 is a schematic drawing of a wheel where the shape and separation of the roller guide tracks are adjusted in order to eliminate/enlarge the space between the rollers and eliminate/build up the force between the rollers and the roller guide tracks as the rollers exit/enter the roller coupling channel.
Figure 34:
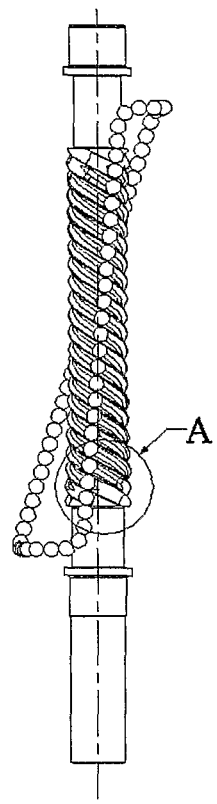
FIG. 34 is a schematic drawing of a design showing one of the bodies and the full cycle of rollers. Section A of the Figure is magnified in FIG. 33.

FIGS. 33 and 34 show another way to optimise the transition for the rollers from the roller coupling channel to the roller recycling channel where, in the ending section of the roller coupling channel, we gradually eliminate the space between the rollers by gradually reducing the distance between the adjacent roller guide tracks. Such an end section A of the wheel 10 is shown in FIG. 34 and is also illustrated in FIG. 33 in an enlarged view. As it can be seen in FIG. 33, by the time the rollers reach the end of the roller coupling channel, the gap between the rollers disappears and the rollers enter the roller recycling channel forming a continuous line. Thus, the chances for the rollers to collide with each other and move in an uncontrolled way are reduced significantly. In a similar way, at the beginning section of the roller coupling channel at the other end of the wheel 10 where the rollers make their way from the roller recycling channel to the roller coupling channel, a gapping between the rollers is introduced by gradually enlarging the distance between the roller guide tracks 12. While the rollers form a continuous line with no gaps between them as they exit the roller recycling channel, they are separated gradually in the beginning section of the roller coupling channel so that their separation reaches the ideal level of gapping required by the operating conditions for the mechanism. In FIGS. 33 and 34 one wheel is shown only but obviously similar adjustments are made to the roller guide tracks on the other wheel as well that correspond directly to the adjustments made on the wheel in the Figures. Changing the direction of the rotation for the wheels the mechanism operates exactly the same way as above except that the rollers' movement changes direction and the beginning and the ending sections of the wheels interchange. Adjusting the distance between the roller guide tracks could result in slight deviation for the system from the ideal operating conditions such as those for pure rolling motion. The deviation is typically very small though and should not alter the characteristic features of the mechanism significantly. In addition, the idea below can also be used to among other things eliminate the effect of the deviation completely.

FIGS. 33 and 34 show that in this example we adjust not only the distance between the roller guide tracks 12 at the beginning and ending sections of the roller coupling channel but also the cross-sectional profile of the roller guide tracks at the same time. In particular, in the ending section of the roller coupling channel, the cross-sectional profile of the roller guide tracks is gradually enlarged in such a way that the corresponding points on the two rolling curves on the two roller guide tracks where the rollers make simultaneous contact with the two wheels gradually move further apart and ultimately become separated by a distance larger than the diameter of the rollers. As a result, the rollers gradually lose contact with the wheels and the forces acting between the rollers and the wheels gradually disappear. In this way, the rollers gradually disengage from coupling while still inside the ending section of the roller coupling channel. This has at least two major benefits. On one hand, the rollers disengage from coupling smoothly with no major shocks during the process. On the other hand, this procedure reduces and ultimately eliminates the negative effects arising from the adjustment of the spacing between the roller guide tracks as given above. The adjustment of the spacing and the adjustment of the cross-sectional profile of the roller guide tracks should be done simultaneously (and gradually) to achieve the greatest effect: on one hand, we gradually move the rollers closer to one another and ultimately eliminate the distance between them by gradually shortening the distance between the roller guide tracks and, simultaneously with this, we gradually disengage the rollers from coupling and ultimately de-couple them from the wheels by gradually expanding the cross-sectional profile of the roller guide tracks. In this way, the rollers make their transition from the roller guide channel to the roller recycling channel in a smooth and orderly fashion causing much less frequent collisions among themselves and as a consequence much less noise in the system. At the same time, the ideal operating conditions for the mechanism such as those for pure rolling motion are maintained. This procedure works exactly the same way albeit in the opposite order at the other end of the wheel where the rollers exit the roller recycling channel and enter the roller coupling channel. We gradually introduce a gapping between the rollers in the beginning section of the roller coupling channel by gradually enlarging the distance between the roller guide tracks and, simultaneously with this, we gradually introduce a coupling between the rollers and the wheels by gradually tightening the cross-sectional profile of the roller guide tracks around the rollers and building up contact and force between the rollers and the wheels. In this way the rollers gradually re-engage into coupling within the roller coupling channel in a smooth and orderly fashion causing much less collisions between the rollers and much less noise in the system. The same adjustments are applied to both ends of both wheels in the mechanism. Changing the direction of rotation for the wheels the mechanism operates exactly the same way except that the rollers' movement changes direction and the beginning and the ending sections of the wheels interchange.

As it is illustrated in the examples above, the roller transmission and gearing mechanism according to the present invention can provide one or more alternative solutions for most of the transmission and gearing tasks and problems that are apparently superior to existing solutions with numerous comparative advantages and benefits. It is characteristic to the mechanism that either or both of the driving and the driven bodies between which the coupling is established by the rollers are set up to rotate around a given rotational axis or move along a given line or a combination of these. The characteristic axes, i.e. the rotational axes and/or the given lines of movement can be set up at practically any relative angle including perpendicular, parallel and other angles. The characteristic axes can be intersecting each other in a plane or can as well be evasive. In typical cases of applications in practice the driving and driven bodies are rotationally symmetric bodies or wheels and the rollers are rolling balls. In some cases, however, one or both of the bodies can be gear racks and also the rollers can be sometimes non-spherical rollers such as cylindrical rollers or barrel rollers. The transmissible torque can be increased if the engagement factor i.e. the number of rollers in simultaneous coupling is increased. A typical feature of the roller transmission and gearing mechanism according to the present invention is that the relative direction of rotation between the driving and driven bodies can be changed arbitrarily by simply applying a different pair of bodies with a different set of roller guide tracks. There is no need to introduce an additional (third idle) wheel in the system like in the case of tooth-wheeled gear drives. One of the main advantages of the roller transmission and gearing mechanism according to the present invention is that it features extremely small frictional energy losses and high power transmission efficiency as a result of the pure rolling motion carried out by the rollers coupling the driving and driven bodies. This remains to be true even in the case of high transmissible torque systems and high gearing ratios. In the case of pure rolling motion energy dissipation due to frictional energy losses is extremely small, in fact it is much smaller than in the case when moving bodies slide along each other's contact surfaces typical for the great majority of the currently existing transmission and gearing systems.

Figure 35:
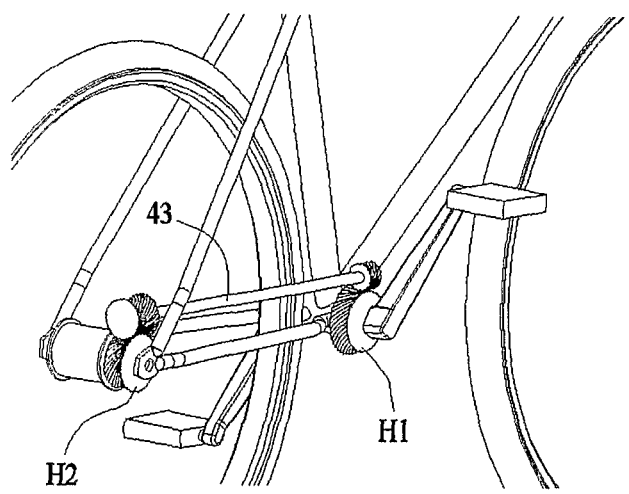
FIG. 35 is a schematic drawing of a particular application example: roller transmission and gearing for bicycles.

The roller transmission and gearing mechanism according to the present invention provides solutions for practically all of the currently existing transmission and gearing tasks and problems. For the sake of illustrating the possible applications of the invention, three examples for respective typical applications will be shown in FIGS. 35 to 37. FIG. 35 shows a bicycle where the new roller transmission and gearing mechanism according to the present invention is applied at two points H1 and H2. The gearing ratio of H1 is 2.625:1 and that of H2 is 1:1. The engagement factor for both drives is about 9. The application of the new mechanism at H1 and H2 makes the bicycle drive simple, compact and robust. No sprocket wheels, no chains unlike in the case of practically the entire bicycle drives today. As a result, the operation is smooth and reliable. The size of each drive H1 and H2 is smaller than the size of the conventional sprocket wheels because due to the high engagement factor the torque is applied to 9 rolling balls simultaneously as opposed to the sprocket wheels where it is applied to only one sprocket at a time. Since there is no chain, the size of the full system is smaller too, and it can be conveniently covered in order to make it more compact, protected and reliable. To make it even more compact axle 43 connecting the drives H1 and H2 can be put inside the frame of the bicycle. The new drive mechanism can also be advantageous for bicycles with foldable frames because due to the simplicity and compactness of the system the bicycle can be easily and quickly folded up whenever necessary. This is not the case for conventional designs because the chain makes the procedure complicated and messy.

Figure 36:
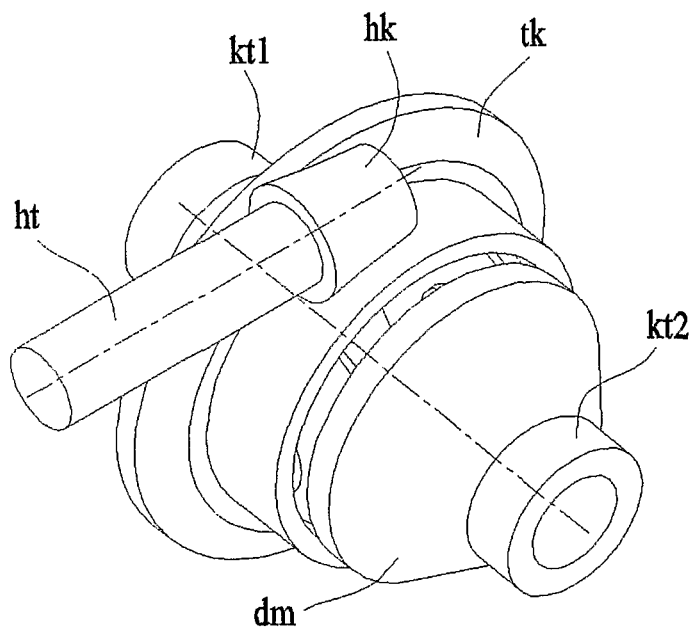
FIG. 36 is a schematic drawing of a particular application example: roller transmission and gearing for differential gears.
Figure 37:
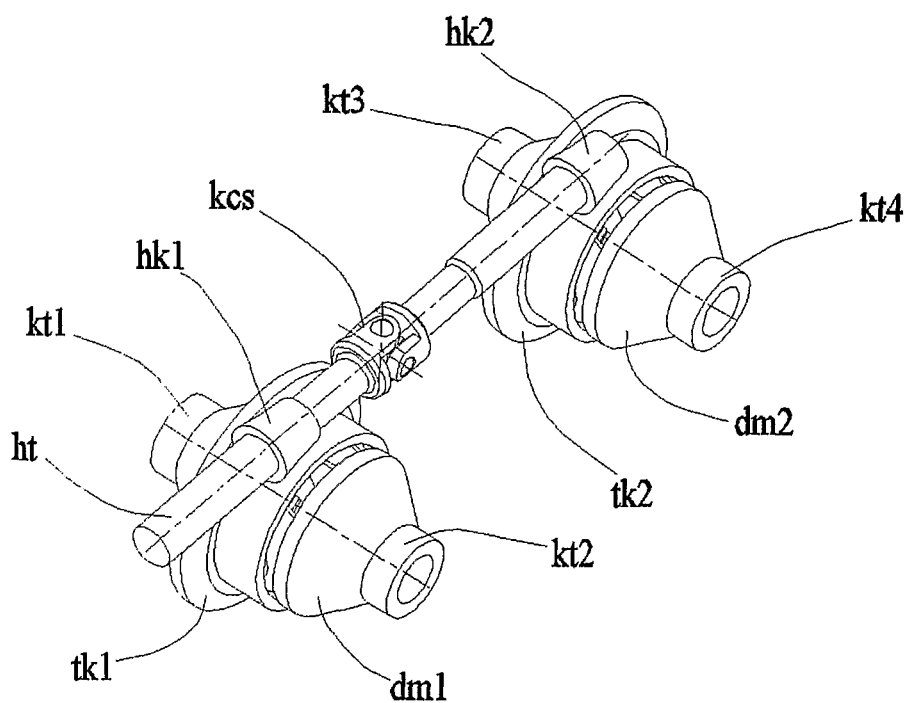
FIG. 37 is a schematic drawing of a particular application example: roller transmission and gearing driving two differential gears simultaneously for vehicles with dual axles

FIG. 36 illustrates how the new roller transmission and gearing mechanism according to the present invention can be applied in the case of differential gears. Half-axles kt1 and kt2 in the Figure are the wheel axles for the vehicle. Drive shaft ht rotates around its axis and delivers the torque coming from the engine to driving wheel hk. The driving wheel hk drives a driven wheel tk according to an appropriate embodiment of the new roller transmission and gearing mechanism according to the present invention. The driving wheel hk corresponds to the wheels 10 and the driven wheel tk to the wheels 20 shown in several previous embodiments. The diameter of the wheel hk is relatively small and the roller guide tracks are developed onto its outer surface while the diameter of the wheel tk is relatively large and the roller guide tracks are developed onto its frontal surface. The axis of the driven wheel tk is perpendicular to that of the driving wheel hk and the two axes form skew lines with respect to each other. This new solution for speed reducing differential gears compares against conventional bevel gears with toothed wheels typical for differential gears currently. The connecting teeth of the wheels in the bevel gear are under great stress in the conventional design even if arc-toothed wheels are applied. In addition, the problem with arc-toothed bevel gears is that they tend to exhibit power transmission efficiency that is much lower than even that of normal toothed-wheel gears with straight teeth. This is because their teeth besides "normal" radial sliding along the profile of the teeth also slide along the arcs of the teeth introducing significant extra frictional energy losses. Applying the new roller transmission and gearing mechanism according to the present invention these problems can be solved naturally. On one hand, the transmissible torque can be greatly increased by increasing the engagement factor in the system without putting much extra stress on the structure, the wheels or the individual rollers themselves. On the other hand, the power transmission efficiency remains to be extremely high since the conditions for pure rolling motion remain to be in effect in exactly the same way as for lower-torque applications The design of differential gears is particularly difficult in the case of vehicles with two driven rear axles. In order to drive both axles simultaneously, gears with axes forming skew lines must be applied. Using conventional toothed-wheel gears these designs exhibit particularly low power transmission efficiency. The new roller transmission and gearing mechanism according to the present invention provides a very advantageous solution as shown in the schematic drawing of FIG. 37. The first axle consisting of the two half-axles kt1 and kt2 is driven by the differential gear dm1 and the second axle consisting of the two half-axles kt3 and kt4 is driven by the differential gear dm2. Both differential gears dm1 and dm2 are driven by the same driving shaft ht simultaneously. The rotational axes of both differential gears viz. the rotational axes of the two half-axles kt1 and kt2 and also of kt3 and kt4 are both skew lines with respect to the rotational axis of the driving shaft ht. The driving shaft ht first connects to the first driving wheel hk1 and then to the second driving wheel hk2. Between the two driving wheels hk1 and hk2 the driving shaft ht goes through a cardan joint kcs. The two driving wheels hk1 and hk2 are the first driving wheels in two gears designed according to the roller transmission and gearing mechanism according to the present invention where they respectively drive the wheels tk1 and tk2. The first driving wheels hk1 and hk2 correspond to the first wheels 10 of the previous examples and the second driven wheels tk1 and tk2 correspond to the second driven wheels 20. The driving wheel hk1 and the driven wheel tk1 as well as wheels hk2 and tk2 are coupled by one of the several embodiments of the roller transmission and gearing mechanism according to the present invention. All the wheels including hk1 and hk2 as well as tk1 and tk2 exhibit roller guide tracks on their surfaces. The driven wheels tk1 and tk2 are connected directly to the respective differential gears dm1 and dm2. Applying this design, both differential gears and the connected half-axles can be driven by a single continuous driving shaft ht simultaneously while at the same time the system can benefit from the advantages of the roller transmission and gearing mechanism according to the present invention including extreme high power transmission efficiency due to pure rolling motion for the coupling rollers and potentially very high gearing ratio. In fact, this design can be extended to an arbitrary number of sequentially placed differential gears where a single driving shaft drives a series of gears with axes forming skew lines with respect to each other. The extreme high power transmission efficiency and other benefits provided by the roller transmission and gearing mechanism according to the present invention can still be maintained even in extreme cases like this.

Besides the three examples shown above the roller transmission and gearing mechanism according to the present invention has lots of other potential applications in practically the entire area of the machinery industry, especially vehicles and transport and handling machinery, machine tools and precision machinery, and also in various other fields of the mechanical engineering industry. Potential applications include a large variety of structural designs and set-ups showing great flexibility for various different positions and angles, forms, shapes and dimensions for the driving and driven bodies, also different kinds of rollers, a large variety of gearing ratios, directions of rotation, transmissible power etc. We believe that the new mechanism can provide superior solutions to probably all of the currently existing transmission and gearing tasks and problems showing major benefits and advantages compared to the currently existing mechanisms and designs. Benefits and advantages include high power transmission efficiency and gearing ratio, compact size and reliability, precise movements and changeable direction of rotation. In addition we also believe that this is such a fundamentally new mechanism that it can also provide solutions in such areas of applications where the currently existing systems are not practically applicable. As a result of its apparently major benefits and advantages we believe that the new roller transmission and gearing mechanism according to the present invention has a great potential to spread over a wide area of applications in various fields of different industries.

Due to inescapable production inaccuracies in practice, the conditions that determine the roller transmission and gearing mechanism according to the present invention including, in particular, those for pure rolling motion for the coupling rollers can only be satisfied to a certain degree of accuracy but never perfectly. In addition to the unwanted but inescapable "natural" inaccuracies, one can imagine possible applications for the roller transmission and gearing mechanism according to the present invention where for various reasons operating conditions are made to deviate from the perfect ones deliberately i.e. inaccuracies are "wanted." In both the wanted and unwanted cases, however, for a relatively wide range of inaccuracies the operational features characteristic to the roller transmission and gearing mechanism according to the present invention can be maintained even if partially and moderately. The present invention is, therefore, not restricted to the roller transmission and gearing mechanism that satisfies the operating conditions mathematically perfectly but also covers those with a certain degree of imperfection. We can measure the degree of imperfection in the roller transmission and gearing mechanism according to the present invention by, for example, looking at the two planes tangential to the two rolling curves at the two points where the rollers simultaneously make contact with the roller guide tracks on the driving and driven bodies and measure how close to parallel the angle between these two planes is. At perfect conditions they should be exactly parallel. Another equivalent measure of imperfection can be the amount by how much the lengths of the two rolling curves differ. At perfect conditions they should be exactly the same, no difference. A moderate amount of imperfection such as a 5-10° deviation from parallel for the above-mentioned tangential planes or a 5-10% difference between the lengths of the above-mentioned rolling curves does not significantly affect the major characteristics of the roller transmission and gearing mechanism according to the present invention. In particular, the conditions for pure rolling motion for the coupling rollers do not deteriorate significantly and the main benefits and advantages of the system are maintained. Thus the present invention is not restricted to the roller transmission and gearing mechanism that works at perfect operating conditions with mathematically exact accuracy but also covers those designs, conditions and situations where although operating conditions deviate to a certain degree from the perfect ones determined by the mathematical equations, the main characteristics of the perfect system including the benefits arising from pure rolling motion for the coupling rollers can be at least partially and moderately maintained.

The invention claimed is:

1. A roller transmission and gearing mechanism, comprising: a driving body, roller means having respective centres or central axes, and a driven body, said driving and driven bodies have different rotational axes wherein said driving body is coupled to said driven body by means of said roller means, said driving and driven bodies are guided for movement having a single degree of freedom, said driving and driven bodies both defining at least one pair of respective roller guide tracks thereon, said at least one pair of roller guide tracks contacting said roller means and determining the relative movement of said roller means with respect to the associated body, said roller means contacting said at least one pair of respective roller guide tracks on said driving and driven bodies along respective rolling curves on each of the driving and driven bodies, said at least one pair of respective roller guide tracks starting and terminating on said driving and driven bodies at respective pairs of limit surfaces, said roller means moving along said at least one pair of respective roller guide tracks, wherein the roles of said driving and driven bodies are interchangeable, wherein distances defined between points of a rolling curve (g1) on said driving body (10, z1) and said respective rolling curve (g2) on said driven body (20, z2) are different, wherein the length of each of said rolling curves (g1) of said driving body (10, z1) is substantially equal to the length of said respective rolling curve (g2) of said driven body (20, z2) between said limit surfaces; and wherein at any moment in operation a roller (G) of said roller guide means contacts said rolling curve (g1) of said driving body (10, z1) at only a single point P1 which is off center with respect off the center of the respective roller guide track, and contacts said rolling curve (g2) of said driven body (20, z2) at only a single point P2, which is off center with respect to the center of the respective roller guide track, diagonally opposite point P1, respective tangential planes (E1, E2) extending through the respective points P1 and P2 are substantially parallel to each other, the velocities (u1, u2) of said roller (G) defined in the coordinate system of said roller (G) at points P1 and P2 are substantially identical but have opposite signs, at said contacting points P1 and P2 the respective action lines of forces (F) acting on said roller (G) intersect the center or central axis of said roller (G), whereby said roller (G) is moved along said at least one pair of respective roller guide tracks (12, 22) following entry until leaving said at least one pair of respective roller guide tracks substantially with pure rolling motion.

2. The roller transmission and gearing mechanism according to claim 1, wherein said roller means is a plurality of spherical rolling balls (30, 30a and 30d).

3. The roller transmission and gearing mechanism according to claim 1, wherein said roller means is rotationally symmetric bodies.

4. The roller transmission and gearing mechanism according to claim 1, further comprising respective roller return paths for guiding said roller means after leaving said roller guide tracks to return to said roller guide tracks.

5. The roller transmission and gearing mechanism according to claim 4, wherein a direction of movement of said roller means when leaving said roller guide tracks and a direction of movement when entering said return path close an angle, the cosine of which is equal to the ratio of the velocity of the roller means in the return path to the velocity of the roller means when leaving said roller guide tracks, an angle having the same measurement is applied between a direction of said return path at the other end thereof and a direction of movement of said roller means when entering said roller guide tracks.

6. The roller transmission and gearing mechanism according to claim 4, wherein a gradually reduced distance is provided between adjacent roller guide tracks close to said roller guide track terminating limit surfaces, and a gradually increased distance is provided between adjacent roller guide tracks close to said roller guide track starting limit surfaces for providing smooth movement of said roller means both along associated roller guide tracks and return paths.

7. The roller transmission and gearing mechanism according to claim 1, wherein at least one of said driving body (10, z1) and the driven body (20, z2) are rotationally symmetric and define respective axes of rotation.

8. The roller transmission and gearing mechanism according to claim 7, wherein both of said driving body (10, z1) and the driven body (20, z2) are rotationally symmetric and have respective non-parallel rotational axes (11 and 21).

9. The roller transmission and gearing mechanism according to claim 1, wherein a plurality of roller guide tracks are defined on at least one of said driving and driven bodies (10, z1; 20, z2).

10. The roller transmission and gearing mechanism according to claim 9, wherein said plurality of roller guide tracks on the same body are identical in shape and curvature and are angularly displaced with respect to each other by respective angular spacings around the rotational axis of the respective body.

11. The roller transmission and gearing mechanism according to claim 10, wherein the displacement angle is 360°/n, where n is the number of equally spaced roller guide tracks on said body.

12. The roller transmission and gearing mechanism according to claim 1, further comprising bafflers (31 and 32) limiting displacement of said roller means in directions other than the path defined by said roller guide tracks, said bafflers (31, 32) being arranged at respective sides of said tracks.

13. The roller transmission and gearing mechanism according to claim 1, further comprising spacers (35) between adjacent roller means to keep a predetermined distance therebetween.

14. The roller transmission and gearing mechanism according to claim 1, wherein said roller guide tracks are gradually enlarged at said starting and ending portions of said tracks when approaching said limit surfaces to reduce said forces acting on said roller means and to facilitate both entry and discharge of said roller means.

* * * * *